United States Patent
Ward et al.

(10) Patent No.: US 9,894,088 B2
(45) Date of Patent: Feb. 13, 2018

(54) DATA MINING TO IDENTIFY MALICIOUS ACTIVITY

(71) Applicant: DAMBALLA, INC., Atlanta, GA (US)

(72) Inventors: Joseph Ward, Atlanta, GA (US); Andrew Hobson, Atlanta, GA (US)

(73) Assignee: Damballa, Inc., Atlanta, GA (US)

( * ) Notice: Subject to any disclaimer, the term of this patent is extended or adjusted under 35 U.S.C. 154(b) by 74 days.

(21) Appl. No.: 14/015,582

(22) Filed: Aug. 30, 2013

(65) Prior Publication Data

US 2014/0068763 A1    Mar. 6, 2014

Related U.S. Application Data

(60) Provisional application No. 61/696,009, filed on Aug. 31, 2012.

(51) Int. Cl.
*H04L 29/06*     (2006.01)

(52) U.S. Cl.
CPC ................ *H04L 63/1425* (2013.01)

(58) Field of Classification Search
CPC ............ H04L 63/1433; H04L 63/1425
USPC ................................... 726/22–23
See application file for complete search history.

(56) References Cited

U.S. PATENT DOCUMENTS

| | | | |
|---|---|---|---|
| 4,843,540 A | 6/1989 | Stolfo | |
| 4,860,201 A | 8/1989 | Stolfo et al. | |
| 5,363,473 A | 11/1994 | Stolfo et al. | |
| 5,497,486 A | 3/1996 | Stolfo et al. | |
| 5,563,783 A | 10/1996 | Stolfo et al. | |
| 5,668,897 A | 9/1997 | Stolfo | |
| 5,717,915 A | 2/1998 | Stolfo et al. | |
| 5,748,780 A | 5/1998 | Stolfo | |
| 5,920,848 A | 7/1999 | Schultzer et al. | |
| 6,401,118 B1 | 6/2002 | Thomas | |

(Continued)

FOREIGN PATENT DOCUMENTS

| | | |
|---|---|---|
| WO | WO 02/37730 | 5/2002 |
| WO | WO 02/098100 | 12/2002 |
| WO | WO 2007/050244 | 5/2007 |

OTHER PUBLICATIONS

U.S. Appl. No. 13/008,257, 2011-0283361, Nov. 17, 2011, Pending.

(Continued)

*Primary Examiner* — John B King
(74) *Attorney, Agent, or Firm* — Pepper Hamilton LLP

(57) ABSTRACT

Systems and methods may determine suspicious network traffic. A monitoring system comprising a processor in communication with a network may monitor network traffic to or from an asset associated with the network. The monitoring system may assess the network traffic to determine a source and/or destination for the network traffic anchor content of the network traffic. The monitoring system may determine whether the network traffic is suspicious network traffic based on the assessed source and/or destination and/or content. When the network traffic is determined to be suspicious network traffic, the monitoring system may capture metadata associated with the suspicious network traffic and store the metadata in a database in communication with the processor. When the network traffic is not determined to be suspicious network traffic, the monitoring system may disregard metadata associated with the network traffic.

13 Claims, 7 Drawing Sheets

(56) References Cited

U.S. PATENT DOCUMENTS

| | | |
|---|---|---|
| 6,983,320 B1 | 1/2006 | Thomas et al. |
| 7,013,323 B1 | 3/2006 | Thomas et al. |
| 7,039,721 B1 | 5/2006 | Wu et al. |
| 7,043,759 B2 | 5/2006 | Kaaschoek et al. |
| 7,069,249 B2 | 6/2006 | Stolfo et al. |
| 7,093,292 B1 | 8/2006 | Pantuso |
| 7,136,932 B1 | 11/2006 | Schneider |
| 7,152,242 B2 | 12/2006 | Douglas |
| 7,162,741 B2 | 1/2007 | Eskin et al. |
| 7,185,368 B2 | 2/2007 | Copeland, III |
| 7,225,343 B1 | 5/2007 | Honig et al. |
| 7,277,961 B1 | 10/2007 | Smith et al. |
| 7,278,163 B2 | 10/2007 | Banzhof |
| 7,290,283 B2 | 10/2007 | Copeland, III |
| 7,331,060 B1 | 2/2008 | Ricciulli |
| 7,372,809 B2 | 5/2008 | Chen et al. |
| 7,383,577 B2 | 6/2008 | Hrastar et al. |
| 7,424,619 B1 | 9/2008 | Fan et al. |
| 7,426,576 B1 | 9/2008 | Banga et al. |
| 7,448,084 B1 | 11/2008 | Apap et al. |
| 7,475,426 B2 | 1/2009 | Copeland, III |
| 7,483,947 B2 | 1/2009 | Starbuck |
| 7,549,169 B1 | 1/2009 | Sobel et al. |
| 7,487,544 B2 | 2/2009 | Schultz et al. |
| 7,512,980 B2 | 3/2009 | Copeland, III et al. |
| 7,536,360 B2 | 5/2009 | Stolfo et al. |
| 7,634,808 B1 | 12/2009 | Szor |
| 7,639,714 B2 | 12/2009 | Stolfo et al. |
| 7,644,150 B1 | 1/2010 | Nucci et al. |
| 7,644,151 B2 | 1/2010 | Jerrim et al. |
| 7,657,935 B2 | 2/2010 | Stolfo et al. |
| 7,665,131 B2 | 2/2010 | Goodman |
| 7,698,442 B1 | 4/2010 | Krishnamurthy |
| 7,712,134 B1 | 5/2010 | Nucci et al. |
| 7,752,125 B1 | 7/2010 | Kothari et al. |
| 7,752,665 B1 | 7/2010 | Robertson et al. |
| 7,779,463 B2 | 8/2010 | Stolfo et al. |
| 7,784,097 B1 | 8/2010 | Stolfo et al. |
| 7,818,797 B1 | 10/2010 | Fan et al. |
| 7,882,542 B2 | 2/2011 | Neystadt |
| 7,886,358 B2 | 2/2011 | Copeland, III |
| 7,890,627 B1 | 2/2011 | Thomas |
| 7,895,326 B2 | 2/2011 | Jerrim et al. |
| 7,913,306 B2 | 3/2011 | Apap et al. |
| 7,930,353 B2 | 4/2011 | Chickering |
| 7,962,798 B2 | 6/2011 | Locasto et al. |
| 7,979,907 B2 | 7/2011 | Schultz et al. |
| 7,996,288 B1 | 8/2011 | Stolfo |
| 8,015,414 B2 | 9/2011 | Mahone |
| 8,019,764 B1 | 9/2011 | Nucci |
| 8,065,722 B2 | 11/2011 | Barford et al. |
| 8,074,115 B2 | 12/2011 | Stolfo et al. |
| 8,161,130 B2 | 4/2012 | Stokes |
| 8,170,966 B1 | 5/2012 | Musat et al. |
| 8,180,916 B1 | 5/2012 | Nucci et al. |
| 8,200,761 B1 | 6/2012 | Tevanian |
| 8,224,994 B1 | 7/2012 | Schneider |
| 8,260,914 B1 | 9/2012 | Ranjan |
| 8,341,745 B1 | 12/2012 | Chau |
| 8,347,394 B1 | 1/2013 | Lee |
| 8,402,543 B1 | 3/2013 | Ranjan et al. |
| 8,418,249 B1 | 4/2013 | Nucci et al. |
| 8,484,377 B1 | 7/2013 | Chen et al. |
| 8,516,585 B2 | 8/2013 | Cao et al. |
| 8,527,592 B2 | 9/2013 | Gabe |
| 8,631,489 B2 | 1/2014 | Antonakakis et al. |
| 8,667,583 B2 | 3/2014 | Polyakov et al. |
| 8,826,438 B2 | 9/2014 | Perdisci et al. |
| 8,832,829 B2 | 9/2014 | Manni et al. |
| 9,516,058 B2 | 12/2016 | Antonakakis et al. |
| 2001/0014093 A1 | 8/2001 | Yoda et al. |
| 2001/0044785 A1 | 11/2001 | Stolfo et al. |
| 2001/0052007 A1 | 12/2001 | Shigezumi |
| 2001/0052016 A1 | 12/2001 | Skene et al. |
| 2001/0055299 A1 | 12/2001 | Kelly |
| 2002/0021703 A1 | 2/2002 | Tsuchiya et al. |
| 2002/0066034 A1 | 5/2002 | Schlossberg et al. |
| 2002/0166063 A1 | 11/2002 | Lachman et al. |
| 2002/0178238 A1 | 11/2002 | Fletcher et al. |
| 2003/0065926 A1 | 4/2003 | Schultz et al. |
| 2003/0065943 A1 | 4/2003 | Geis et al. |
| 2003/0069992 A1 | 4/2003 | Ramig |
| 2003/0145233 A1 | 7/2003 | Poletto et al. |
| 2003/0167402 A1 | 9/2003 | Stolfo et al. |
| 2003/0204621 A1 | 10/2003 | Poletto et al. |
| 2003/0236995 A1 | 12/2003 | Fretwell, Jr. |
| 2004/0002903 A1 | 1/2004 | Stolfo et al. |
| 2004/0039798 A1 | 2/2004 | Hotz et al. |
| 2004/0044791 A1 | 3/2004 | Pouzzner |
| 2004/0088346 A1 | 5/2004 | Yeager |
| 2004/0088348 A1 | 5/2004 | Yeager |
| 2004/0111636 A1 | 6/2004 | Baffes et al. |
| 2004/0181687 A1 | 9/2004 | Nachenberg et al. |
| 2004/0187032 A1 | 9/2004 | Gels et al. |
| 2004/0205474 A1 | 10/2004 | Eskin et al. |
| 2004/0215972 A1 | 10/2004 | Sung et al. |
| 2005/0021848 A1 | 1/2005 | Jorgenson |
| 2005/0036501 A1 | 2/2005 | Chung et al. |
| 2005/0039019 A1 | 2/2005 | Delany |
| 2005/0044406 A1 | 2/2005 | Stute |
| 2005/0050377 A1 | 3/2005 | Chan et al. |
| 2005/0086523 A1 | 4/2005 | Zimmer et al. |
| 2005/0108407 A1 | 5/2005 | Johnson et al. |
| 2005/0108415 A1 | 5/2005 | Turk et al. |
| 2005/0210534 A1 | 9/2005 | Krishnamurthy |
| 2005/0257264 A1 | 11/2005 | Stolfo et al. |
| 2005/0261943 A1 | 11/2005 | Quarterman et al. |
| 2005/0265331 A1 | 12/2005 | Stolfo |
| 2005/0278540 A1 | 12/2005 | Cho |
| 2005/0281291 A1 | 12/2005 | Stolfo et al. |
| 2006/0015630 A1 | 1/2006 | Stolfo et al. |
| 2006/0026682 A1 | 2/2006 | Zakas |
| 2006/0031483 A1 | 2/2006 | Lund |
| 2006/0067240 A1 | 3/2006 | Kim et al. |
| 2006/0068806 A1 | 3/2006 | Nam |
| 2006/0075084 A1 | 4/2006 | Lyon |
| 2006/0078096 A1 | 4/2006 | Poyhonen |
| 2006/0143711 A1 | 6/2006 | Huang et al. |
| 2006/0146816 A1 | 7/2006 | Jain |
| 2006/0150249 A1 | 7/2006 | Gassen et al. |
| 2006/0156402 A1 | 7/2006 | Stone et al. |
| 2006/0168024 A1 | 7/2006 | Mehr |
| 2006/0174345 A1 | 8/2006 | Flanagan et al. |
| 2006/0176822 A1 | 8/2006 | Doyle et al. |
| 2006/0178994 A1 | 8/2006 | Stolfo et al. |
| 2006/0200539 A1 | 9/2006 | Kappler |
| 2006/0212925 A1 | 9/2006 | Shull et al. |
| 2006/0212942 A1 | 9/2006 | Barford et al. |
| 2006/0224677 A1 | 10/2006 | Ishikawa et al. |
| 2006/0230039 A1 | 10/2006 | Shull |
| 2006/0247982 A1 | 11/2006 | Stolfo et al. |
| 2006/0253581 A1 | 11/2006 | Dixon |
| 2006/0253584 A1 | 11/2006 | Dixon |
| 2006/0259967 A1 | 11/2006 | Thomas et al. |
| 2006/0265436 A1 | 11/2006 | Edmond |
| 2006/0288415 A1 | 12/2006 | Wong |
| 2007/0050708 A1 | 3/2007 | Gupta et al. |
| 2007/0056038 A1 | 3/2007 | Lok |
| 2007/0064617 A1 | 3/2007 | Reves |
| 2007/0076606 A1 | 4/2007 | Olesinski |
| 2007/0083931 A1 | 4/2007 | Spiegel |
| 2007/0118669 A1 | 5/2007 | Rand |
| 2007/0136455 A1 | 6/2007 | Lee et al. |
| 2007/0162587 A1 | 7/2007 | Lund et al. |
| 2007/0198679 A1 | 8/2007 | Duyanovich et al. |
| 2007/0209074 A1 | 9/2007 | Coffman |
| 2007/0239999 A1 | 10/2007 | Honig et al. |
| 2007/0253377 A1 | 11/2007 | Janneteau et al. |
| 2007/0274312 A1 | 11/2007 | Salmela et al. |
| 2007/0294339 A1 | 12/2007 | Ala-Kleemola et al. |
| 2007/0294419 A1 | 12/2007 | Ulevitch |
| 2008/0005555 A1 | 1/2008 | Lotem et al. |
| 2008/0016570 A1 | 1/2008 | Capalik |
| 2008/0028073 A1 | 1/2008 | Trabe et al. |

(56) References Cited

U.S. PATENT DOCUMENTS

| | | |
|---|---|---|
| 2008/0028463 A1 | 1/2008 | Dagon |
| 2008/0060054 A1 | 3/2008 | Srivastava |
| 2008/0060071 A1 | 3/2008 | Hennan |
| 2008/0098476 A1 | 4/2008 | Syversen |
| 2008/0133300 A1 | 6/2008 | Jalinous |
| 2008/0155694 A1 | 6/2008 | Kwon et al. |
| 2008/0177736 A1 | 7/2008 | Spangler |
| 2008/0177755 A1 | 7/2008 | Stern et al. |
| 2008/0178293 A1 | 7/2008 | Keen et al. |
| 2008/0184371 A1 | 7/2008 | Moskovitch |
| 2008/0195369 A1 | 8/2008 | Duyanovich et al. |
| 2008/0222729 A1 | 9/2008 | Chen et al. |
| 2008/0229415 A1 | 9/2008 | Kapoor |
| 2008/0262985 A1 | 10/2008 | Cretu et al. |
| 2008/0263659 A1 | 10/2008 | Alme |
| 2008/0276111 A1 | 11/2008 | Jocoby et al. |
| 2009/0055929 A1 | 2/2009 | Lee et al. |
| 2009/0083855 A1 | 3/2009 | Apap et al. |
| 2009/0106304 A1 | 4/2009 | Song |
| 2009/0138590 A1 | 5/2009 | Lee et al. |
| 2009/0171871 A1 | 7/2009 | Zhang et al. |
| 2009/0193293 A1 | 7/2009 | Stolfo et al. |
| 2009/0198997 A1 | 8/2009 | Yeap |
| 2009/0210417 A1 | 8/2009 | Bennett |
| 2009/0222922 A1 | 9/2009 | Sidiroglou et al. |
| 2009/0241190 A1* | 9/2009 | Todd et al. ............... 726/23 |
| 2009/0241191 A1 | 9/2009 | Keromytis et al. |
| 2009/0254658 A1 | 10/2009 | Kamikura et al. |
| 2009/0254989 A1 | 10/2009 | Achan et al. |
| 2009/0254992 A1 | 10/2009 | Schultz et al. |
| 2009/0265777 A1 | 10/2009 | Scott |
| 2009/0282479 A1 | 11/2009 | Smith et al. |
| 2009/0327487 A1 | 12/2009 | Olson et al. |
| 2010/0011243 A1 | 1/2010 | Locasto et al. |
| 2010/0011420 A1 | 1/2010 | Drako |
| 2010/0017487 A1 | 1/2010 | Patinkin |
| 2010/0023810 A1 | 1/2010 | Stolfo et al. |
| 2010/0031358 A1 | 2/2010 | Elovici et al. |
| 2010/0034109 A1 | 2/2010 | Shomura et al. |
| 2010/0037314 A1 | 2/2010 | Perdisci et al. |
| 2010/0043047 A1 | 2/2010 | Archer et al. |
| 2010/0054278 A1 | 3/2010 | Stolfo et al. |
| 2010/0064368 A1 | 3/2010 | Stolfo et al. |
| 2010/0064369 A1 | 3/2010 | Stolfo et al. |
| 2010/0071068 A1 | 3/2010 | Bauschert et al. |
| 2010/0077481 A1 | 3/2010 | Polyakov et al. |
| 2010/0077483 A1 | 3/2010 | Stolfo et al. |
| 2010/0082758 A1 | 4/2010 | Golan |
| 2010/0138919 A1 | 6/2010 | Peng |
| 2010/0146615 A1 | 6/2010 | Locasto et al. |
| 2010/0153785 A1 | 6/2010 | Keromytis et al. |
| 2010/0169970 A1 | 7/2010 | Stolfo et al. |
| 2010/0235915 A1 | 9/2010 | Memon et al. |
| 2010/0269175 A1 | 10/2010 | Stolfo et al. |
| 2010/0274970 A1 | 10/2010 | Treuhaft et al. |
| 2010/0275263 A1 | 10/2010 | Bennett et al. |
| 2010/0281539 A1 | 11/2010 | Burns et al. |
| 2010/0281541 A1 | 11/2010 | Stolfo et al. |
| 2010/0281542 A1 | 11/2010 | Stolfo et al. |
| 2010/0319069 A1 | 12/2010 | Granstedt |
| 2010/0332680 A1 | 12/2010 | Anderson et al. |
| 2011/0040706 A1 | 2/2011 | Sen et al. |
| 2011/0041179 A1 | 2/2011 | Stahlberg |
| 2011/0055123 A1 | 3/2011 | Kennedy |
| 2011/0067106 A1 | 3/2011 | Evans et al. |
| 2011/0167493 A1 | 7/2011 | Song et al. |
| 2011/0167494 A1 | 7/2011 | Bowen et al. |
| 2011/0185423 A1 | 7/2011 | Sallam |
| 2011/0185428 A1 | 7/2011 | Sallam |
| 2011/0214161 A1 | 9/2011 | Stolfo et al. |
| 2012/0079101 A1 | 3/2012 | Muppala et al. |
| 2012/0084860 A1 | 4/2012 | Cao et al. |
| 2012/0102568 A1 | 4/2012 | Tarbotton et al. |
| 2012/0117641 A1 | 5/2012 | Holloway |
| 2012/0143650 A1* | 6/2012 | Crowley et al. ............. 705/7.28 |
| 2012/0151585 A1 | 6/2012 | Lamastra et al. |
| 2012/0198549 A1 | 8/2012 | Antonakakis |
| 2012/0215909 A1 | 8/2012 | Goldfarb et al. |
| 2013/0054802 A1 | 2/2013 | Donzis et al. |
| 2013/0174253 A1 | 7/2013 | Thomas et al. |
| 2013/0232574 A1 | 9/2013 | Carothers |
| 2014/0068763 A1 | 3/2014 | Ward et al. |
| 2014/0068775 A1 | 3/2014 | Ward et al. |
| 2014/0075558 A1 | 3/2014 | Ward et al. |
| 2014/0090058 A1 | 3/2014 | Ward et al. |
| 2014/0289854 A1 | 9/2014 | Mahvi |
| 2015/0026808 A1 | 1/2015 | Perdisci et al. |
| 2016/0156660 A1 | 6/2016 | Dagon et al. |
| 2016/0285894 A1 | 9/2016 | Nelms et al. |

OTHER PUBLICATIONS

U.S. Appl. No. 13/749,205, 2013-0191915, Jul. 25, 2013, Pending.
U.S. Appl. No. 14/015,621, 2014-0075558, Mar. 13, 2014, Pending.
U.S. Appl. No. 14/015,661, Aug. 30, 2013, Pending.
U.S. Appl. No. 14/093,803, 2014-0157414, Jun. 5, 2014, Pending.
U.S. Appl. No. 14/194,076, Feb. 28, 2014, Pending.
Cliff Changchun Zou et al., "Code Red Worm Propagation Modeling and Analysis", In Proceedings of 9th ACM Conference on Computer and Communications Security (CCS '02), Nov. 18, 2002.
Cliff C. Zou et al,. "Email Worm Modeling and Defense", In the 13th ACM International Confrerence on Computer Communications and Networks (CCCN '04), Oct. 27, 2004.
Cliff Changchun Zou et al., "Monitoring and Early Warning for Internet Worms", In Proceedings fo the 10th ACM Conference on Computer and Communications Security (CCS '03), Oct. 2003.
Cliff Changchun Zou et al., "On the Performance of Internet Worm Scanning Strategies", Technical Report TR-03-CSE-07, Umass ECE Dept., Nov. 2003.
Alexander Gostev, "Malware Elovution Jan.-Mar. 2005", Viruslist. com, http.//www.viruslist.com/en/analysis?pubid=162454316, (Apr. 18, 2005).
Jiang Wu et al., "An Effective Architecture and Algorithm for Detecting Worms with Various Scan Techniques", In Proceedings of the 11th Annual Network and Distributed System Security Symposium (NDSS '04), Feb. 2004.
Matthew M. Williamson et al., "Virus Throttling for Instant Messaging", Virus Bulletin Conference, Sep. 2004, Chicago, IL, USA, (Sep. 2004).
F. Weimer, "Passive DNS Replication", http://www.enyo.de/fw/software/dnslogger, 2005.
Ke Wang et al., "Anomalous Payload-Based Network Intrusion Detection", In Proceedings of the 7th International Symposium on Recent Advances in Intrusion Detection (RAID 2004), 2004.
P. Vixie et al,. "RFC 2136: Dynamic Updates in the Domain Name System (DNS Update)", http://www.faqs.org/rfcs.rfc2136.html (Apr. 1997).
Joe Stewart, "Dipnet/Oddbob Worm Analysis", SecureWorks, http://www.secureworks.com/research/threats/dipnet/ (Jan. 13, 2005).
Harold Thimbleby et al., "A Framework for Modeling Trojans and Computer Virus Infection", Computer Journal, vol. 41, No. 7, pp. 444-458 (1999).
Paul Bachner et al., "Know Your Enemy: Tracking Botnets", http://www.honeynet.org/papers/bots/, (Mar. 13, 2005).
"LockDown Security Bulletin—Sep. 23, 2001", http://lockdowncorp.com/bots/ (Sep. 23, 2001).
Colleen Shannon et al., "The Spread of the Witty Worm", http://www.caida.org/analysis/security/witty/index.xml (Mar. 19, 2004).
Moheeb Abu Rajab et al., "On the Effectiveness of Distributed Worm Monitoring", In Proceedings fo the 14th USENIX Security Symposium (2005).
Niels Provos, "CITI Technical Report 03-1: A Virtual Honeypot Framework", http://www.citi.umich.edu/techreports/reports/citi-tr-03-1.pdf (Oct. 21, 2003).
"Know your Enemy: Honeynets", http://www.honeypot.org/papers/honeynet, (May 31, 2006).

(56) References Cited

OTHER PUBLICATIONS

David Moore et al., "Internet Quarantine: Requirements for Containing Self-Propagating Code", In Proceedings of the IEEE INFOCOM 2003, Mar. 2003.
Joe Stewart, "I-Worm Baba Analysis", http://secureworks.com/research/threats/baba (Oct. 22, 2004.
David Moore et al., "Slammer Worm Dissection: Inside the Slammer Worm", IEEE Security & Privacy, vol. 1, No. 4 (Jul.-Aug. 2003).
David Moore et al., "Code-Red: A Case Study on the Spread and Victims of an Internet Worm", http://www.icir.org/vern/imw-2002/imw2002-papers/209.ps/gz (2002).
Joe Stewart, "Sinit P2P Trojan Analysis", http://www.secureworks.com/research/threats/sinit, (Dec. 8, 2003).
Martin Krzywinski, "Port Knocking—Network Authentication Across Closed Ports", Sys Admin Magazine, vol. 12, pp. 12-17 (2003).
Christopher Kruegel et al., "Anomaly Detection of Web-Based Attacks", In Proceedings of the 10th ACM Conference on Computer and Communication Security (CCS '03), Oct. 27-31, 2003, Washington, DC, USA, pp. 251-261.
"Dabber Worm Analysis", LURHQ Threat Intelligence Group, http://www.lurhq.com/dabber.html (May 13, 2004).
Abstract of Jeffrey O. Kephart et al,. "Directed-Graph Epidemiological Models of Computer Viruses", Proceedings of the 1991 IEEE Computer Symposium on Research in Security and Privacy; Oakland, CA, May 20-22, 1991; pp. 343-359 May 20-22, 1991).
C. Kalt "RFC 2810—Internet Relay Chat: Architecture" http://faqs.org/rfcs/rfc2810.html (Apr. 2000).
Xuxian Jiang et al., "Cerias Tech Report 2005-24: Virtual Playgrounds for Worm Behavior Investigation", Purdue University, Feb. 2005.
Neal Hindocha et al., "Malicious Threats and Vulnerabilities in Instant Messaging", Virus Bulletin International Conference, Sep. 2003.
Thomer M. Gil, "NSTX (IP-over-DNS) Howto", http://thomer.com/howtos/nstx.html, Nov. 4, 2005 (5 pages).
V. Fuller et al., "RFC 1519—Classless Inter-Domain Routing (CIDR): An Address Assignment and Aggregation Strategy", http://www.faqs.org/rfcs/rfc1519.html (Sep. 1993).
David E. Smith "Dynamic DNS", http://www.technopagan.org/dynamic (Aug. 7, 2006).
Dave Dittrich, "Active Response Continuum Research Project", http://www.staff.washington.edu/dittrich/arc/ (Nov. 14, 2005).
Joe Stewart, "Akak Trojan Analysis", http://www.secureworks.com/research/threats/akak/ (Aug. 31, 2004).
Monirul I. Sharif, "Mechanisms of Dynamic Analysis and DSTRACE".
Kapil Kumar Singh, "IRC Reconnaissance (IRCRecon) Public IRC Heuristics (BotSniffer)" (Jul. 24, 2006).
http://www.trendmicro.com/en/home/us/home.htm.
"InterCloud Security Service", http://ww.trendmicro.com/en/products/nss/icss/evaluate/overview.thm.
"2006 Press Releases: Trend Micro Takes Unprecedented Approach to Eliminating Botnet Threats with the Unveiling of InterCloud Security Service", http://www.trendmicro.com/en/about/news/pr/archive/2006/pr092506.htm, (Sep. 25, 2006).
Paul F. Roberts, "Trend Micro Launches Anti-Botnet Service", InfoWorld, http://www.infoworld.com/article/06/09/25/HNtrendintercloud_1.html (Sep. 25, 2006).
CNN Technology News—Expert: Botnets No. 1 Emerging Internet Threat, CNN.com, http://www.cnn.com/2006/TECH/internet/01/31/furst.index.html (Jan. 31, 2006).
Evan Cooke et al., "The Zombie Roundup: Understanding, Detecting, and Disrupting Botnets", In USENIX Workshop on Steps to Reducing Unwanted Traffic on the Internet (SRUTI), Jun. 2005.
Sven Dietrich et al., "Analyzing Distributed Denial of Service Tools: The Shaft Case", Proceedings of the 14th Systems Administration Conference (LISA 2000), New Orleans, Louisiana, USA, Dec. 3-8, 2000.
Felix C. Freiling et al,. "Botnet Tracking: Exploring a Root-Cause Methodology to Prevent Distributed Denial-of-Service Attacks", ESORICS 2005, LNCS 3679, pp. 319-335 (2005).
Luiz Henrique Gomes et al,. "Characterizing a Spam Traffic", In Proc. ACM SIGCOMM Internet Measurement Conference (IMC '04), Oct. 25-27, 2004 Taormina, Sicily, Italy, pp. 356-369.
Christopher W. Hanna, "Using Snort to Detect Rogue IRC Bot Programs", Technical Report, SANS Institute 2004 (Oct. 8, 2004).
Jaeyeon Jung et al., "An Empirical Study of Spam Traffic and the Use of DNS Black Lists", In Proc. ACM SIGCOMM Internet Measurement Conference (IMC '04), Oct. 25-27, 2004, Taormina, Sicily, Italy, pp. 370-375.
Srikanth Kandula et al., "Botz-4-Sale: Surviving Organized DDoS Attacks That Mimic Flash Crowds", Technical Report LCS TR-969, Laboratory for Computer Science, MIT, 2004.
Sven Krasser et al., "Real-Time and Forensic Network Data Analysis Using Animated and Coordinated Visualization", Proceedings of the 6th IEEE Information Assurance Workshop (Jun. 2005).
David Moore et al., "Inferring Internet Denial-of-Service Activity", In Proceedings of the 2001 USENIX Security Symposium, 2001.
Stephane Racine, "Master's Thesis: Analysis for Internet Relay Chat Usage by DDoS Zombies", ftp://www.tik.ee.ethz.ch/pub/students/2003-2004-Wi/MA-2004-01.pdf (Nov. 3, 2003).
Anirudh Ramachandran et al., "Understanding the Network-Level Behavior of Spammers", SIGCOMM '06, Sep. 11-15, 2006, Pisa, Italy, pp. 291-302.
Ramneek Puri, "Bots & Botnet: An Overview", SANS Institute 2003, http://www.giac.com/practical/GSEC/Ramneek_Puri_GSEC.pdf (Aug. 8, 2003).
Stuart E. Schechter et al., "Access for Sale: A New Class of Worm", In 2003 ACM Workshop on Rapid Malcode (WORM '03), ACM SIGSAC, Oct. 27, 2003, Washington, DC, USA.
Stuart Staniford, "How to Own the Internet in Your Spare Time", In Proc. 11th USENIX Security Symposium, San Francisco, CA, Aug. 2002.
Martin Overton, "Bots and Botnets: Risks, Issues and Prevention", 2005 Virus Bulletin Conference at the Burlington, Dublin, Ireland, Oct. 5-7, 2005, http://arachnid.homeip.net/papers/VB2005-Bots_and_Botnets-1.0.2.pdf.
Yin Zhang et al., "Detecting Stepping Stones", Proceedings of the 9th USENIX Security Symposium, Denver, Colorado, USA, Aug. 14-17, 2000.
Joe Stewart, "Bobax Trojan Analysis", http://www.lurhq.com/bobax.html, May 17, 2004.
David Brumley et al., "Tracking Hackers on IRC", http://www.doomded.com/texts/ircmirc/TrackingHackersonIRC.htm, Dec. 8, 1999.
Brian Krebs, "Bringing Botnets Out of the Shadows", Washingtonpost.com, http://www.washingtonpost.com/wp-dyn/content/artcile/2006/03/21/AR2006032100279_pf.html, Mar. 21, 2006.
"SwatIT: Bots, Drones, Zombies, Worms and Other Things That Go Bump in the Night", http://swatit.org/bots, 2004.
Christian Kreibich, "Honeycomb: Automated NIDS Signature Creation Using Honeypots", 2003, http://www.cl.cam.ac.uk/research/srg/netos/papers/2003-honeycomb-sigcomm-poster.pdf.
DMOZ Open Directory Project, Dynamic DNS Providers List, http://dmoz.org/Computers/Software/Internet/Servers/Address_Management/Dynamic_DNS_Services/.
David Moore, "Network Telescopes: Observing Small or Distant Security Events", http://www.caida.org/publications/presentations/2002/usenix_sec/usenix_sec_2002_files/frame.htm; Aug. 8, 2002.
Vincent H. Berk et al., "Using Sensor Networks and Data Fusion for Early Detection of Active Worms", Sensors, and Command, Control, Communications, and Intelligence (C3iI) Technologies for Homeland Defense and Law Enforcement II, Proceedings of SPIE, vol. 5071, pp. 92-104 (2003).
David Dagon et al., "Worm Population Control Through Periodic Response", Technical Report, Georgia Institute for Technology, Jun. 2004.
Scott Jones et al., "The IPM Model of Computer Virus Management", Computers & Security, vol. 9, pp. 411-418 (1990).

(56) References Cited

OTHER PUBLICATIONS

Jeffrey O. Kephart et al., "Directed-Graph Epidemiological Models of Computer Viruses", In Proceedings of IEEE Symposium on Security and Privacy, pp. 343-359 (1991).
Darrell M. Kienzle et al., "Recent Worms: A Survey and Trends", In WORM '03, Proceedings of the 2003 ACM Workshop on Rapid Malcode, Washington, DC, USA, pp. 1-10, Oct. 27, 2003.
Bill McCarty, "Botnets: Big and Bigger", IEEE Security and Privacy Magazine, vol. 1, pp. 87-89 (2003).
Xinzhou Qin et al., "Worm Detection Using Local Networks", Technical Report GIT-CC-04-04, College of Computing, Georgia Institute of Technology, Feb. 2004.
Yang Wang et al., "Modeling the Effects of Timing Parameters on Virus Propagation", In Proceedings of ACM CCS Workshop on Rapid Malcode (WORM '03), Washington, DC, pp. 61-66, Oct. 27, 2003.
Donald J. Welch et al., "Strike Back: Offensive Actions in Information Warfare", in AMC New Security Paradigm Workshop, pp. 47-52 (1999).
T. Liston, "Welcome to my Tarpit: The Tactical and Stragetic Use of LaBrea", http://www.hackbusters.net/LaBrea/LaBrea.txt, Oct. 24, 2001.
R. Pointer, "Eggdrop Development", http://www.eggheads.org, Oct. 1, 2005.
S. Staniford, "Code Red Analysis Pages: July Infestation Analysis", http://silicondefense.org/cr/july.html, Nov. 18, 2001.
Alex Ma, "NetGeo—The Internet Geographic Database", http://www.caida.org/tools/utilities/netgeo/index.xml, Sep. 6, 2006.
MathWorks Inc. Simulink, http://www.mathworks.com/products/simulink, Dec. 31, 2005.
David Dagon et al., "Modeling Botnet Propagation Using Time Zones", In Proceedings of the 13th Annual Network and Distributed Systems Security Symposium (NDSS '06), Feb. 2006.
John Canavan, "Symantec Security Response: W32.Bobax.D", http://www.sarc.com/avcent/venc/data/w32.bobax.d.html, May 26, 2004.
"Whois Privacy", www.gnso.icann.org/issues/whois-privacy/index/shtml, Jun. 3, 2005.
John D. Hardin, "The Scanner Tarpit HOWTO", http://www.impsec.org/linus/security/scanner-tarpit.html, Jul. 20, 2002.
Charles J. Krebs, "Ecological Methodology", Harper & Row, Publishers, New York, pp. v-x, 15-37, 155-166, and 190-194 (1989).
D.J. Daley et al., "Epidemic Modeling: An Introduction", Cambridge University Press, pp. vii-ix, 7-15, and 27-38 (1999).
Lance Spitzner, "Honeypots: Tracking Hackers", Addison-Wesley, pp. vii-xiv, 73-139, 141-166, and 229-276 (2003).
International Search Report issued in Application No. PCT/US06/038611 dated Jul. 8, 2008.
Written Opinion issued in Application No. PCT/US06/038611 dated Jul. 8, 2008.
International Preliminary Report on Patentability issued in Application No. PCT/US06/038611 dated Mar. 26, 2009.
O. Diekmann et al,. "Mathematical Epidemiology of Infectious Diseases: Model Building, Analysis and Interpretation", John Wiley & Son, Ltd., 2000, pp. v-xv and 1-303.
Jelena Mirkovic et al,. "Internet Denial of Service: Attack and Defense Mechanisms", Prentice Hall Professional Technical Reference, 2004, pp. v-xxii and 1-372.
"Symantec Internet Security Threat Report: Trends for Jan. 1, 2004-Jun. 30, 2004" Symantec, Sep. 2004, pp. 1-54.
David Dagon et al., "HoneyStat: Local Worm Detection Using Honeypots", RAID 2004, LNCS 3224, pp. 39-58 (2004).
Jonghyun Kim et al., "Measurement and Analysis of Worm Propagation on Internet Network Topology", IEEE, pp. 495-500 (2004).
Andreas Marx, "Outbreak Response Times: Putting AV to the Test", www.virusbtn.com, Feb. 2004, pp. 4-6.
Vinod Yegneswaran et al., "Global Intrusion Detection in the DOMINO Overlay System", Proceedings of Network and Distributed Security Symposium (NDSS), 17 pages Feb. 2004.
Vinod Yegneswaran et al., "On the Design and Use of Internet Sinks for Network Abuse Monitoring", RAID 2004, LNCS 3224, pp. 146-165 (2004).
Cliff Changchun Zou et al., "Worm Propagation Modeling and Analysis Under Dynamic Quarantine Defense", WORM'03, Oct. 27, 2003, Washington, DC USA, 10 pages.
Cliff C. Zou et al., "Routing Worm: A Fast, Selective Attack Worm Based on IP Address Information", Technical Report: TR-03-CSE-06, Principles of Advanced and Distributed Simulation (PADS) 2005, pp. 199-206, Jun. 1-3, 2005.
Thorsten Holz, "Anti-Honeypot Technology", 21st Chaos Communication Congress, slides 1-57, Dec. 2004.
"CipherTrust's Zombie Stats", http://www.ciphertrust.com/resources/statistics/zombie.php 3 pages, printed Mar. 25, 2009.
Joe Stewart, "Phatbot Trojan Analysis", http://www.secureworks.com/research/threats/phatbot, Mar. 15, 2004, 3 pages.
Thorsten Holz et al., "A Short Visit to the Bot Zoo", IEEE Security & Privacy, pp. 7679 (2005).
Michael Glenn, "A Summary of DoS/DDoS Prevention, Monitoring and Mitigation Techniques in a Service Provider Environment", SANS Institute 2003, Aug. 21, 2003, pp. ii-iv, and 1-30.
Dennis Fisher, "Thwarting the Zombies", Mar. 31, 2003, 2 pages.
Dongeun Kim et al., "Request Rate Adaptive Dispatching Architecture for Scalable Internet Server", Proceedings of the IEEE International Conference on Cluster Computing (Cluster'00); pp. 289-296 (2000).
Keisuke Ishibashi et al., "Detecting Mass-Mailing Worm Infected Hosts by Mining DNS Traffic Data", SIGCOMM'05 Workshops, pp. 159-164 (Aug. 22-26, 2005).
Nicholas Weaver et al., "A Taxonomy of Computer Worms", WORM'03, pp. 11-18 (Oct. 27, 2003).
File History of U.S. Appl. No. 12/985,140.
File History of U.S. Appl. No. 13/358,303.
Stephan Axelsson, "The Base-Rate Fallacy and the Difficulty of Intrusion Detection", ACM Transactions on Information and System Security, vol. 3, No. 3, pp. 186-205 (Aug. 2000).
Niel Landwehr et al., "Logistic Model Trees", Machine Learning, vol. 59, pp. 161-205 (2005).
Richard O. Duda et al., "Pattern Classification, Second Edition", John Wiley & Sons, Inc., pp. vii-xx, and 1-654, Copyright 2001.
Guofei Gu et al. "BotMiner: Clustering Analysis of Network Traffic Protocol- and Structure-Independent Botnet Detection", 2008, USENIX Security Symposium, pp. 139-154.
Zhu et al., "Using Failure Information Analysis to Detect Enterprise Zombies," Lecture note of the Institute for Computer Science, Social-Informatics and Telecommunications Engineering, vol. 19, part 4, pp. 185-206, 2009.
Manos Antonakakis et al., "Building a Dynamic Reputation System for DNS", 19th USENIX Security Symposium, Aug. 11-13, 2010 (17 pages).
Manos Antonakakis et al., "Detecting Malware Domains at the Upper DNS Hierarchy", In Proceeding of the 20th USENIX Security Symposium, Aug. 8-12, 2011 (16 pages).
Leyla Bilge et al., "EXPOSURE: Finding Malicious Domains Using Passive DNS Analysis", 18th Annual Network and Distributed System Security Symposium, Feb. 6-9, 2011 (17 pages).
"Virus:Win32/Expiro.Z". http://www.microsoft.com/security/portal/Threat/Encyclopedia/Entry.aspx, Jun. 9, 2011 (5pages).
Mike Geide, "Another Trojan Bamital Pattern", http://research.zscaler.com/2011/05/another-trojan-bamital-pattern.html, May 6, 2011 (5 pages).
Sergey Golovanov et al., "TDL4—Top Bot", http://www.secuirlist.com/en/analysis/204792180/TDL4_Top_Bot, Jun. 27, 2011 (15 pages).
P. Mockapetris, "Domain Names—Concepts and Facilities", Network Working Group, http://www.ietf.org/rfc/rfc1034.txt, Nov. 1987 (52 pages).
P. Mockapetris, "Domain Names—Implementation and Specification", Network Working Group, http://www.ietf.org/rfc/rfc1035.txt, Nov. 1987 (52 pages).
Phillip Porras et al. "SRI International Technical Report: An Analysis of Conficker's Logic and Rendezvous Points", http://mtc.sri.com/Conficker/, Mar. 19, 2009, (31 pages).

(56) References Cited

OTHER PUBLICATIONS

Phillip Porras et al. "SRI International Technical Report: Conficker C Analysis", http://mtc.sri.com/Conficker/addendumC, Apr. 4, 2009, (24 pages).
Paul Royal, Damballa, "Analysis of the Kracken Botnet", Apr. 9, 2008 (13 pages).
Sergei Shevchenko, "Srizbi's Domain Calculator", http://blog.threatexpert.com/2008/11/srizbix-domain-calculator.html, Nov. 28, 2008 (3 pages).
Sergei Shevchenko, "Domain Name Generator for Murofet", http://blog.threatexpert.com/2010/10/domain-name-generator-for-murofet.html, Oct. 14, 2010 (4 pages).
P Akritidis et al., "Efficient Content-Based Detection of Zero-Day Worms", 2005 IEEE International Conference in communications, vol. 2, pp. 837-843, May 2005.
M. Patrick Collins et al., "Hit-List Worm Detection and Bot Identification in Large Networks Using Protocol Graphs", RAID 2007, LNCS 4637, pp. 276-295 (2007).
Nicholas Weaver et al., "Very Fast Containment of Scanning Worms", In proceedings of the 13th USENIX Security Symposium, pp. 29-44, Aug. 9-13, 2004.
David Whyte et al., "DNS-Based Detection of Scanning Worms in an Enterprise Network", In Proc. of the 12th Annual Network and Distributed System Security Symposium, pp. 181-195, Feb. 3-4, 2005.
Cristian Abad et al., "Log Correlation for Intrusion Detection: A Proof of Concept", In Proceedings of the 19th Annual Computer Security Application Conference (ACSAC'03), (11 pages) (2003).
Lala A. Adamic et al., "Zipf's Law and the Internet", Glottometrics, vol. 3, pp. 143-150 (2002).
K.G. Anagnostakis et al., "Detecting Targeted Attacks Using Shadow Honeypots", In Proceedings of the 14th USENX Secuirty Symposium, pp. 129-144 (2005).
Paul Baecher et al., "The Nepenthes Platform: An Efficient Approach to Collect Malware", In Proceedings of Recent Advances in Intrusion Detection (RAID 2006), LNCS 4219, pp. 165-184, Sep. 2006.
Paul Barford et al., "An Inside Look at Botnets", Special Workshop on Malware Detection, Advances in Information Security, Spring Verlag, pp. 171-192 (2006).
James R. Binkley et al., "An Algorithm for Anomaly-Based Botnet Detection", 2nd Workshop on Steps to Reducing Unwanted Traffic on the Internet (SRUTI '06), pp. 43-48, Jul. 7, 2006.
Steven Cheung et al., "Modeling Multistep Cyber Attacks for Scenario Recognition", In Proceedings of the Third DARPA Information Survivability Conference and Exposition (DISCEX III), vol. 1, pp. 284-292, Apr. 22-24, 2003.
Evan Cooke et al., "The Zombie Roundup: Understanding, Detecting, and Disrupting Botnets", Steps to Reducing Unwanted Traffic on the Internet Workshop (SRUTI '05), pp. 39-44, Jul. 7, 2005.
Frederic Cuppens et al., "Alert Correlation in a Cooperative Intrusion Detection Framework", In Proceedings of IEEE Symposium on Security and Privacy 2002, pp. 202-215 (2002).
David Dagon et al., "Modeling Botnet Propagation using Time Zones", The 13th Annual Network and Distributed System Security Symposium 2006, Feb. 2-3, 2006 (18 pages).
Roger Dingledine et al., "Tor: The Second-Generation Onion Router", In Proceedings of the 13th Usenix Security Symposium, pp. 303-320 Aug. 9-13, 2004.
Steven T. Eckman et al., "STATL: An Attack Language for State-Based Intrusion Detection", Journal of Computer Security, vol. 10, pp. 71-103 (2002).
Daniel R. Ellis, et al., "A Behavioral Approach to Worm Detection", WORM'04, Oct. 29, 2004 (11 pages).
Prahlad Fogla et al., "Polymorphic Blending Attacks", In Proceedings of 15th Usenix Security Symposium, pp. 241-256, (2006).
Jan Goebel, "Rishi: Identify Bot Contaminated Hosts by IRC Nickname Evaluation", Hot Bots'07, Apr. 10, 2007 (14 pages).

Koral Ilgun et al., "State transition Analysis: A Rule-Based Intrusion Detection Approach", IEEE Transactions on Software Engineering, vol. 21, No. 3, pp. 181-199, Mar. 1995.
Xuxian Jiang et al., "Profiling Self-Propagating Worms via Behavioral Footprinting", WORM'06, Nov. 3, 2006 (7 pages).
Giovanni Vigna et al., "NetSTAT: A Network-based Intrusion Detection Approach", In Proceedings of the 14th Annual Computer Security Applications Conference (ACSAC '98), pp. 25-34, Dec. 7-11, 1998.
Kelly Jackson Higgins, "Shadowserver to Build 'Sinkhole' Server to Find Errant Bots: new Initiative Will Emulate IRC, HTTP Botnet Traffic", http://darkreading.com/taxonomy/index/printarticle/id/211201241. Sep. 24, 2008 (2 pages).
Kelly Jackson Higgins, "Hacking a New DNS Attack: DNS Expert Disputes Georgia Tach and Google Research That Points to Malicious Deployment of Certain Types of DNS Servers", http://darkreading.com/taxonomy/index/printarticle/id/208803784. Dec. 18, 2007 (2 pages).
Christian Kreibich, "Honeycomb: Automated Signature Creation Using Honeypots", http://www.icir.org/christain/honeycomb/index.html, Mar. 26, 2007, (3 pages).
Artem Dinaburg et al., "Ether: Malware Analysis via Hardware Virtualization Extensions", CCS'08, Oct. 27-31, 2008 (12 pages).
Paul Royal, "Alternative Medicine: The Malware Analyst's Blue Pill", Black Hat USA 2008, Aug. 6, 2008 (33 pages).
Paul Royal, "Alternative Medicine: The Malware Analyst's Blue Pill", www.damballa.com/downloads/r_pubs/KrakenWhitepaper.pdf (2008) (3pages).
Robert Perdisci et al., "Behavioral Clustering of HTTP-Based Malware and Signature Generation Using Malicious Network Traces", Usenix Symposium on Networked Systems Design and Implementation (NSDI 2010), (2010) (16 Pages).
Christopher Kruegel et al., "Polymorphic Worm Detection using Structural Information of Executables", RAID 2005, pp. 207-226 (2005).
Paul Vixie, "DNS Complexity", ACM Queue, pp. 24-29, Apr. 2007.
Ke Wang et al., "Anagram: A Content Anomaly Detector Resistant to Mimicry Attack", In Proceedings of the International Symposium on Recent Advances in Intrusion Detection (RAID) (2006) (20 pages).
Ke Wang et al., "Anomalous Payload-Based Worm Detection and Signature Generation", In Proceedings of the International Symposium on Recent Advances in Intrusion Detection (RAID) (2005) (20 pages).
David Whyte, "Exposure Maps: Removing Reliance on Attribution During Scan Detection", 1st Usenix Workshop on Hot Topics in Security, pp. 51-55 (2006).
Jiahai Yang et al., "CARDS: A Distributed System for Detecting Coordinated Attacks", In Sec (2000) (10 pages).
Vinod Yegneswaran et al., "Using Honeynets for Internet Situational Awareness", In proceedings of the Fourth Workshop on Hot Topics in Networks (HotNets IV), Nov. 2005 (6 pages).
David Dagon et al., "Corrupted DNS Resolution Paths: The Rise of a Malicious Resolution Authority", In Proceedings of Network and Distributed Security Symposium (NDSS '08) (2008) (15 pages).
Dihe's IP-Index Browser, http://ipindex.homelinux.net/index.php, updated Oct. 13, 2012 (1 page).
Shuang Hao et al., "An Internet-Wide View into DNS Lookup Patterns", http://labs.verisign.com/projects/malicious-domain-names/white-paper/dns-imc2010.pdf (2010) (6 pages).
Thorsten Holz et al., "Measuring and Detecting Fast-Flux Service Networks", In Proceedings of NDSS (2008) (12 pages).
Jaeyeon Jung et al., "DNS Performance and the Effectiveness of Caching", IEEE/ACM Transactions on Networking, vol. 10, No. 5, pp. 589-603, Oct. 2002.
The Honeynet Project & Research Alliance, "Know Your Enemy: Fast-Flux Service Networks: An Ever Changing Enemy", http://old.honeynet.org/papers/ff/fast-flux.html, Jul. 13, 2007 (10 pages).
Duane Wessels et al., "Measurements and Laboratory Simulations of the Upper DNS Hierarchy", In PAM (2005) (10 pages).
Joe Stewart, "Top Spam Botnets Exposed", http://www.secureworks.com/cyber-threat-intelligence/threats/topbotnets/, Apr. 8, 2008 (11 pages).

(56) References Cited

OTHER PUBLICATIONS

Brett Stone-Gross et al., "Your Botnet is My Botnet: Analysis of a Botnet Takeover", CCS'09, Nov. 9-13, 2009 (13 pages).
Sam Stover et al., "Analysis of the Storm and Nugache Trojans: P2P is here", Login, vol. 32, No. 6, pp. 18-27, Dec. 2007.
"Storm Botnet", http://en.wikipedia.org/wiki/Storm_botnet, Printed Jan. 29, 2013 (7 pages).
Jeff Williams, "What We Know (and Learn) for the Waledac Takedown", http://blogs.technet.com/b/mmpc/archive/2010/03/15/what-we-know-and-learned-from-the-waledac-takedown.aspx, Mar. 15, 2010 (2 pages).
"Trojan: Java/Boonan", http://microsoft.com/security/portal/threat/encyclopedia/entry.aspx?Name=Trojan%3AJava%2FBoonan, Apr. 17, 2011 (5 pages).
Julia Wolf, "Technical Details of Srizbi's Domain Generation Algorithm", http://blog.fireeye.com/research/2008/11/technical-details-of-srizbis-domain-generation-algorithm.html, Nov. 25, 2008 (4 pages).
Sandeep Yadav et al., "Detecting Algorithmically Generated Malicious Domain Names", In Proceedings of the 10th Annual Conference on Internet Measurement (IMC'10), pp. 48-61, Nov. 1-3, 2010.
"TEMU: The BitBlaze Dynamic Analysis Component", http://bitblaze.cs.berkeley.edu/temu.html, printed Jan. 29, 2013 (1 page).
Paul Bacher et al., "Know Your Enemy: Tracking Botnets: Using Honeynets to Learn More About Bots", http://www.honeynet.org/papers/bots, Aug. 10, 2008 (1 page).
Michael Bailey et al., "Automated Classification and Analysis of Internet Malware", RAID 2007, LNCS 4637, pp. 178-197 (2007).
Paul Barham et al., "Xen and the Art of Virtualization", SOSP'03, Oct. 19-22, 2003 (14 pages).
Ulrich Bayer et al., "TTAnalyze: A Tool for Analyzing Malware", In Proceedings of the 15th Annual Conference European Institute for Computer Antivirus Research (EICAR), pp. 180-192 (2006).
Fabrice Bellard, "QEMU, A Fast and Portable Dynamic Translator", In Proceedings of the Annual Confernce on Usenix Annual Technical Conference, pp. 41-46 (2005).
Kevin Borders et al., "Siren: Catching Evasive Malware (Short Paper)", IEEE Symposium on Security and Privacy, pp. 78-85, May 21-24, 2006.
Christopher M. Bishop, Pattern Recognition and Machine Learning (Information Science and Statistics), Springer-Verlag New York, Inc., Secauscus, NJ, USA, 2006.
Ronen Feldman et al., "The Text Mining Handbook: Advance Approaches in Analyzing Unstructured Data", Cambridge Univ. Pr., 2007.
Michael Hale Ligh et al., "Malware Analyst's Cookbook and DVD", Wiley, 2010.
M. Newman, "Networks: An Introduction", Oxford University Press, 2010.
Matt Bishop, "Computer Security: Art and Science", Addison-Wesley Professional, 2003.
Neils Provos et al., "Virtual Honeypots: Form Botnet Tracking to Intrusion Detection", Addison-Wesley Professional, Reading, 2007.
Michael Sipser, "Introduction to the Theory of Computation", International Thomson Publishing, 1996.
Peter Szor, "The Art of Computer Virus Research and Defense", Addison-Wesley Professional, 2005.
Anil K. Jain et al., "Algorithms for Clustering Data", Prentice-Hall, Inc., 1988.
V. Laurikari, "TRE", 2006 (5 pages).
P. Porras, "Inside Risks: Reflections on Conficker", Communications of the ACM, vol. 52, No. 10, pp. 23-24, Oct. 2009.
Changda Wang et al., "The Dilemma of Covert Channels Searching", ICISC 2005, LNCS 3935, pp. 169-174, 2006.
C. Willems et al., "Toward Automated Dynamic Malware Analysis Using CWSandbox", IEEE Security and Privacy, vol. 5, No. 2, pp. 32-39, 2007.
R Developmental Core Team, "R: A Language and Environment for statistical Computing", R. Foundation for Statistical Computing, Vienna Austria, 2008.
Simon Urbanek, "rJava: Low-Level-R to Java Interface", printed May 6, 2013 (5 pages).
Juan Caballero et al., "Polyglot: Automatic Extraction of Protocol Message Format Using Dynamic Binary Analysis", In Proceedings of ACM Conference on Computer and Communication Security, Oct. 2007 (15 pages).
Mihai Christodorescu et al., "Semantics-Aware Malware Detection", In Proceeding of the 2005 IEEE Symposium on Security and Privacy, pp. 32-46 (2005).
Mihai Christodorescu et al,. "Mining Specifications on Malicious Behavior", ESEC/FSE'07, Sep. 3-7, 2007 (10 pages).
Peter Ferrie, "Attacks on Virtual Machine Emulators", Symantec Advance Threat Research, 2006 (13 pages).
Peter Ferrie, "Attacks on More Virtual Machine Emulators", Symantec Advance Threat Research, http://pferrie.tripod.com/papers/attacks2.pdf, 2007 (17 pages).
Tal Garfinkel et al., "A Virtual Machine Introspection Based Architecture for Intrusion Detection", In Proceedings of Network and Distributed Systems Security Symposium, Feb. 2003 (16 pages).
G. Hunt et al., "Detours: Binary Interception of WIN32 Functions", Proceedings of the 3rd Usenix Windows NT Symposium, Jul. 12-13, 1999 (9 pages).
Xuxian Jiang et al., "Stealthy Malware Detection Through VMM-Based "Out-of-the-Box" Semantic View Reconstruction", CCS'07, Oct. 29-Nov. 2, 2007 (11 pages).
Xuxian Jiang et al., "Virtual Playgrounds for Worm Behavior Investigation", RAID 2005, LNCS 3858, pp. 1-21 (2006).
Min Gyung Kang et al., "Renovo: A Hidden Code Extract for Packed Executables", WORM'07, Nov. 2, 2007 (8 pages).
Christopher Kruegel et al., "Detecting Kernel-Level Rootkits Through Binary Analysis", In Proceedings of the Annual Computer Security Applications Conference (ACSAC), pp. 91-100, Dec. 2004.
Lorenzo Martignoni et al., "OmniUnpack: Fast, Generic, and Safe Unpacking of Malware", In Proceedings of the Annual Computer Security Applications Conference (ACSAC), pp. 431-441 (2007).
Thomas Raffetseder et al., "Detecting System Emulators", In ISC, pp. 1-18 (2007).
Paul Royal et al., "PolyUnpack: Automating the Hidden-Code Extraction of Unpack-Executing Malware", In Proceedings of the Annual Computer Security Applications Conference (ACSAC), pp. 289-300 (2006).
Rich Uhlig et al., "Intel Virualization Technology", Computer, vol. 38, No. 5, pp. 48-56, May 2005.
Amit Vasudevan et al., "Stealth Breakpoints", In Proceedings of the 21st Annual Computer Security Applications Conference (ACSAC), pp. 381-392, (2005).
Amit Vasudevan et al., "Cobra: Fine-Grained Malware Analysis Using Stealth Localized-Executions", In Proceedings of the 2006 IEEE Symposium on Security and Privacy (S&P'06), pp. 264-279 (2006).
Yi-Min Wang et al., "Automated Web Patrol with Strider HoneyMonkeys: Finding Web Sites That Exploit Browser Vulnerabilities", In NDSS'06 (2006) (15 pages).
Heng Yin et al., "Panorama: Capturing System-Wide Information Flow for Malware Detection and Analysis", In Proceedings of ACM Conference on Computer and Communication Security, Oct. 29-Nov. 2, 2007 (13 pages).
Joanna Rutkowska, "Introducing Blue Pill", http://theinvisbilethings.blogspot.com/2006/06/introducing-blue-pill.html, Jun. 22, 2006 (26 pages).
Peter Ferrie, "Anti-Unpacker Tricks", In Proceedings of the 2nd International CARO Workshop (2008) (25 pages).
Danny Quist, "Covert Debugging Circumventing Software Armoring Techniques"; In Proceedings of Black Hat USA 2007 (2007) (5 pages).
Ulrich Bayer et al., "Scalable, Behavior-Based malware Clustering", In Network and Distributed System Security Symposium (2009) (18 pages).
David Brumley et al., "Automatically Identifying Trigger-Based Behavior in Malware", Botnet Detection, pp. 1-24 (2008).

(56) References Cited

OTHER PUBLICATIONS

Dancho Danchev, "Web Based Botnet Command and Control Kit 2.0", http://ddanchev.blogspot.com/2008/08/web-based-botnet-command-and-control.html, Aug. 22, 2008 (5 pages).
Ozgun Erdogan et al., "Hash-AV: Fast Virus Signature matching by Cache-Resident Filters", Int. J. Secur. Netw., vol. 2, pp. 50-59 (2007).
Fanglu Guo et al., "A Study of the Packer Problem and Its Solutions", In Recent Advances in Intrusion Detection (RAID 2008), LNCS 5230, pp. 95-115 (2008).
Maria Halkidi et al., "On Clustering Validation Techniques", Journal of Intelligent Information Systems, vol. 17, pp. 107-145 (2001).
A.K. Jain et al., "Data Clustering: A Review", ACM Computing Surveys, vol. 31, No. 3, pp. 264-323, Sep. 1999.
John P. John et al., "Studying Spamming Botnets using Botlab", In Usenix Symposium on Networked Systems Design and Implementation (NDSI), (2009) (16 pages).
Hyang-Ah Kim et al., "Autograph: Toward Automated, distributed Worm Signature Detection", In Usenix Security Symposium (2004) (16 pages).
Clemens Kolbitsch et al., "Effective and Efficient Malware Detection at the End Host", In 18th Usenix Security Symposium, pp. 351-366 (2009).
Kevin Borders et al., "Protecting Confidential Data on Personal Computers with Storage Capsules", In 18th Usenix Security Symposium, pp. 367-382 (2009).
Ralf Hund et al., "Return-Oriented Rootkits: Bypassing Kernel Code Integrity Protection Mechanisms", In 18th Usenix Security Symposium, pp. 383-398 (2009).
Christian Kreibich et al., "Honeycomb—Creating Intrusion Detection Signatures Using Honeypots", In ACM Workshop on Hot Topics in Networks (2003) (6 pages).
Zhichun Li et al., "Hamsa: Fast Signature Generational for Zero-Day Polymorphic Worms with Provable Attack Resilience", In IEEE Symposium on Security and Privacy (2006) (15 pages).
James Newsome et al., "Polygraph: Automatically Generating Signatures for Polymorphic Worms", In IEEE Symposium on Security and Privacy (2005) (16 pages).
Sun Wu et al., "AGREP—A Fast Approximate Pattern-Matching Tool", In Usenix Technical Conference (1992) (10 pages).
Vinod Yegneswaren et al.,, "An Architecture for Generating Semantics-Aware Signatures", In Usenix Security Symposium (2005) (16 pages).
Jaeyeon Jung, "Fast Portscan Detection Using Sequential Hypothesis Testing", In Proceedings of IEEE Symposium on Security Privacy, pp. 211-225 (2004).
Anestis Karasaridis et al., "Wide-Scale Botnet Detection and Characterization", In Usenix Workshop on Hot Topics in Understanding Botnets (HotBots'07), Apr. 11-13, 2007 (9 pages).
Carl Livades et al., "Using Machine Learning Techniques to Identify Botnet Traffic", In 2nd IEEE LCN Workshop on Network Security (WoNS'2006), pp. 967-974 (2006).
"CVE-2006-3439", http://cve.mitre.org/cgi-bin/cvename.cgi?name=CVE-2006-3439, printed Jun. 27, 2012 (2 pages).
David Moore, "Inferring Internet Denial-of-Service Activity", In Proceedings of the 10th Usenix Security Symposium, Aug. 13-17, 2001 (15 pages).
Peng Ning et al., "Constructing Attack Scenarios Through Correlation of Intrusion Alerts", In Proceedings of Computer and Communications Security (CCS'02), Nov. 18-22, 2002 (10 pages).
Vern Paxson, "Bro: A System for Detecting Network Intruders in Real-Time", In Proceedings of the 7th Usenix Security Symposium, Jan. 26-29, 1998 (22 pages).
Roberto Perdisci et al., "Using an Ensemble of One-Class SVM Classifiers to Harden Payload-Based Anomaly Detection Systems", In Proceedings of the 6th International Conference on Data Mining (ICDM'06), pp. 488-498, Dec. 2006.
Phillip A. Porras, "Privacy-Enabled Global Threat Monitoring", IEEE Security & Privacy, pp. 60-63 (2006).
Moheeb Abu Rajab et al., "A Multifaceted Approach to Understanding the Botnet Phenomenon", In Proceedings of the ACM SIGCOMM/Usenix Internet Measurement Conference (ICM'06), Oct. 25-27, 2006 (12 pages).
Anirudh Ramachandran et al., "Understanding the Network-Level Behavior of Spammers", In Proceedings of the 2006 Conference on Applications, Technologies, Architectures, and Protocols for Computer Communications (SIGCOMM'06), Sep. 11-16, 2006 (13 pages).
Martin Roesch, "SNORT—Lightweight Intrusion Detection for Networks", In Proceedings of 13th System Administration Conference (LISA'99), pp. 229-238, Nov. 7-12, 1999.
Robin Sommer et al., "Enhancing Byte-Level Network Intrusion Detection Signatures with Context", In Proceedings of the 10th ACM Conference on Computer and Communications Security (CCS'03), pp. 262-271, Oct. 27-30, 2003.
"W32/IRCBot-TO", http://www.sophos.com/virusinfo/analyses.w32ircbotto.html, Jan. 19, 2007 (1 page).
Stuart Staniford et al., "Practical Automated Detection of Stealthy Portscans", Journal of Computer Security, vol. 10, pp. 105-136 (2002).
S. Staniford-Chen et al., "GrIDS—A Graph Based Intrusion Detection System for Large Networks", In Proceedings of the 19th National Information Systems Security Conference, pp. 361-370 (1996).
Steven J. Templeton et al., "A Requires/Provides Model for Computer Attacks", In Proceedings of the 2000 Workshop on New Security Paradigms (NSPW'00), pp. 31-38 (2000).
Alfonso Valdes et al., "Probabilistic Alert Correlation", In Proceedings of the Recent Attack in Intrusion Detection (RAID 2001), LNCS 2212, pp. 54-68 (2001).
Fredrik Valeur et al., "A Comprehensive Approach to Intrusion Detection Alert Correlation", IEEE Transactions on Dependable and Secure Computing, vol. 1, No. 3, pp. 146-169, Jul. 2004.
Kjersti Aas et al., "Text Categorisation: A Survey", Norwegian Computing Center, Jun. 1999 (38 pages).
M. Andrews, "Negative Caching of DNS Queries (DNS NCACHE)", http://tools.ietf.org/html/rfc2308, Mar. 1998, (20 pages).
Simon Biles, "Detecting the Unknown with Snort and Statistical Packet Anomaly Detecting Engine", www.cs.luc.edu/~pld/courses/447/sum08/class6/biles.spade.pdf (2003) (9 pages).
James Newsome et al., "Paragraph: Thwarting Signature Learning by Training Maliciously", In Recent Advance in Intrusion Detection (RAID), 2005 (21 pages).
Jon Oberheide et al., "CloudAV: N-Version Antivirus in the Network Cloud", In Proceedings of the 17th Usenix Security Symposium, pp. 91-106 (2008).
Dan Pelleg et al., "X-Means: Extending K-Means with Efficient Estimation of the Numbers of Clusters", In International Conference on Machine Learning (2000) (8 pages).
Roberto Perdisci et al., "Misleading Worm Signature Generators Using Deliberate Noise Injection", In IEEE Symposium on Security and Privacy (2006) (15 pages).
Mark Felegyhazi et al., "On the Potential of Proactive Domain Blacklisting", In the Third Usenix LEET Workshop (2010) (8 pages).
Konrad Rieck et al., "Learning and Classification of Malware Behavior", DIMVA 2008, LNCS 5137, pp. 108-125 (2008).
Sumeet Singh et al., "Automated Worm Fingerprinting", In ACM/USENIX Symposium on Operating System Design and Implementation, Dec. 2004 (16 pages).
"EFnet Chat Network", http://www.efnet.org, dated Jun. 18, 2007 (3 pages).
Guofei Gu et al. "Bothunter: Detecting Malware Infection Through IDS-Driven Dialog Correlation", Proceedings of 16th USENIX Security Symposium, pp. 167-182 (2007).
The Conficker Working Group, "Conficker Working Group: Lessons Learned", Conficker_Working_Group_Lessons_Learned_17_June_2010_final.pdf, published Jan. 2011 (59 pages).
Manos Antonakakis et al., "The Command Structure of the Aurora Bonet", http://www.damballa.com/downloads/r_pubs/Aurora_Botnet_Command_Structure.pdf, 2010 (31 pages).

(56) References Cited

OTHER PUBLICATIONS

R. Arends et al., "Protocol Modifications for the DNS Security Extensions", htp://www.ietf.org/rfc/rfc4035.txt, Mar. 2005 (50 pages).

R. Arends et al., "DNS Security Introduction and Requirements", htp://www.ieft.org/rfc/rfc4033.txt, Mar. 2005 (20 pages).

R. Arends et al., "Resource Records for the DNS Security Extensions", htp://www.ietf.org/rfc/rfc4034.txt, Mar. 2005 (28 pages).

Andreas Berger et al., "Assessing the Real-World Dynamics of DNS", Lecture Notes in Computer Science, vol. 7189, pp. 1-14 (2012).

Global Research & Analysis Team (GReAT), "Full Analysis of Flame's Command & Control Servers", http://www.securelist.com/en/blog/750/Full_Analysis_of_Flames_Command_Control_Servers, Sep. 17, 2012 (10 pages).

Nicolas Falliere et al., "W32.Stuxnet Dossier", http://www.symantec.com/content/en/us/enterprise/media/security_response/whitepapers/w32_stuxnet_dossier.pdf, Feb. 2011 (69 pages).

Steinar H. Gunderson, "Global IPv6 Statistics: Measuring the Current State of IPv6 for Ordinary Users", http://meetings.ripe.net/ripe-57/presentations/Colitti-Global_IPv6_statistics_-_Measuring_the_current_state_of IPv6_for_ordinary_users_.7gzD.pdf, Oct. 24-30, 2008 (20 pages).

Jaeyeon Jung et al., "Modeling TTL-Based Internet Caches", IEEE INFOCOM 2003, pp. 417-426, Mar. 2003.

Srinivas Krishnan et al., "DNS Prefetching and Its Privacy Implications: When Good Things Go Bad", In Proceeding of the 3rd USENIX Conference on Large-Scale Exploits and Emergent Threats: Botnets, Spyware, Worms, and More (LEET'10), (2010) (9 pages).

Zhuoqing Morley Mao et al., "A Precise and Efficient Evaluation of the Proximity Between Web Clients and Their Local DNS Servers", In Proceedings of USENIX Annual Technical Conference (2002) (14 pages).

Mozilla Foundation, "Public Suffix List", http://publicsuffix.org/, printed May 23, 2013 (8 pages).

David Plonka et al., "Context-Aware Clustering of DNS Query Traffic", In Proceedings of the 8th IMC (2008) (13 pages).

RSA FraudAction Research Labs, "Anatomy of an Attack", http://blogs.rsa.com/rivner/anatomy-of-an-attack/, Apr. 1, 2011 (17 pages).

Steve Souders, "Sharing Dominant Domains", http://www.stevesouders.com/blog/2009/05/12/sharding-dominant-domains, May 12, 2009 (3 pages).

Paul Vixie, "What DNS Is Not", Communications of the ACM, vol. 52, No. 12, pp. 43-47, Dec. 2009.

N. Weaver et al., "Redirecting DNS for ADS and Profit", In USENIX Workshop on Free and Open communications on the Internet (FOCI), Aug. 2011 (6 pages).

Florian Weimer, "Passive DNS Replication", In Proceedings of the 17th Annual First Conference on Computer Security Incident, Apr. 2005 (13 pages).

Manos Antonakakis et al., "Unveiling the Network Criminal Infrastructure of TDSS/TDL4", http://www.damballa.com/downloads/r_pubs/Damballa_tdss_tdl4_case_study_public.pdf, (undated) (16 pages).

Manos Antonakakis et al. "From Throw-Away Traffic to Bots: Detecting the Rise of DGA-Based Malware", In Proceedings of the 21st USENIX Conference on Security Symposium (Security'12), (2012) (16 pages).

T. Berners-Lee et al., "RFC3986—Uniform Resource Identifier (URI): Generic Syntax", http://www.hjp.at/doc/rfc/rfc3986.html, Jan. 2005 (62 pages).

Juan Caballero et al., "Measuring Pay-Per-Install: The Commoditization of malware Distribution", In Proceedings of the 20th USENIX Conference on Security (SEC'11), (2011) (16 pages).

Chih-Chung Chang et al., "LIBSVM: A Library for Support Vector Machines" ACM Transactions on Intelligent Systems and Technology 2011, Last Updated Jun. 14, 2007 (26 pages).

Dancho Danchev, "Leaked DIY Malware Generating Tool Spotted in the Wild", http://blog.webroot.com/2013/01/18/leaked-diy-malware-generating-tool-spotted-in-the-wild/, Jan. 18, 2013 (6 pages).

D. De La Higuera et al., "Topology of Strings: Median String is NP-Complete", Theoretical Computer Science, vol. 230, pp. 39-48 (2000).

Robert Edmonds, "ISC Passive DNS Architecture", http://kb.isc.org/getAttach/30/AA-00654/passive-dns-architecture.pdf, Mar. 2012 (18 pages).

Manuel Egele et al., "A Survey on Automated Dynamic Malware-Analysis Techniques and Tools", ACM Computing Surveys, vol. 44, No. 2, Article 6, pp. 6:1-6:42, Feb. 2012.

Dennis Fisher, "Zeus Source Code Leaked", http://threatpost.com/en_us/blogs/zeus-source-code-leaked-051011, May 10, 2011 (6 pages).

Guofei Gu et al., "BotSniffer: Detecting Botnet Command and Control Channels in Network Traffic", In Proceedings of the 15th Annual Network and Distributed System Security Symposium (NDSS'08), Feb. 2008 (18 pages).

Grefoire Jacob, "Jackstraws: Picking Command and Control Connections from Bot Traffic", In Proceedings of the 20th USENIX Conference on Security (SEC'11) (2011) (16 pages).

Jiyong Jang et al., "Bitshred: Feature Hashing Malware for Scalable Triage and Semantic Analysis", In Proceedings of the 18th ACM Conference on Computer and Communications Security (CCS'11), pp. 309-320, Oct. 17-21, 2011.

J. Zico Kolter et al., "Learning to Detect and Classify Malicious Executables in the Wild", Journal of Machine Learning Research, vol. 7, pp. 2721-2744, Dec. 2006.

John C. Platt, "Probablistic Outputs for Support Vector Machines and Comparisons to Regularized Likelihood Methods", Advances in Large margin Classifiers, vol. 10, No. 3, pp. 61-74, Mar. 26, 1999.

Team Cymru, "Developing Botnets", http://www.team-cymru.com/ReadingRoom/Whitepapers/2010/developing-botnets.pdf (2010) (3 pages).

Brett Stone-Gross et al., "Pushdo Downloader Variant Generating Fake HTTP Requests", http://www.secureworks.com/cyber-threat-intelligence/threats/Pushdo_Downloader_Variant_Generating_Fake_HTTP_Requests/, Aug. 31, 2012 (4 pages).

Peter Wurzinger et al., "Automatically Generating Models for Botnet Detection", In Proceedings of the 14th European Conference on Research in Computer Security (ESORICS'09), pp. 232-249 (2009).

Yinglian Xie et al., "Spamming Botnet: Signatures and Characteristics", In Proceeding of the ACM SIGCOMM 2008 Conference on Data Communications (SIGCOMM'08), pp. 171-182, Aug. 17-22, 2008.

Yajin Zhou et al., "Dissecting Android Malware: Characterization and Evolution", 2012 IEEE Symposium on Security and Privacy, pp. 95-109 (2012).

Nello Cristianini et al., "An Introduction to Support Vector Machines: and other Kernal-Based Learning Methods", Cambridge University Press, New York, NY, USA (2000).

Timo Sirainen, "IRSSI", http://en.wikipedia.org/wiki/Irssi, updated May 8, 2013 (3 pages).

Team Cymru, "IP to ASN Mapping", http://www.team-cymru.org/Services/ip-to-asn.html, printed Mar. 23, 2013 (6 pages).

http://www.bleedingsnort.com, retrieved from Internet Archive on May 23, 2013, Archived Sep. 26, 2006 (3 pages).

http://www.dshield.org, retrieved from Internet Archive on May 23, 2013, Archived Sep. 29, 2006 (2 pages).

http://www.alexa.com, retrieved from Internet Archive on May 23, 2013, Archived Sep. 25, 2006 (3 pages).

https://sie.isc.org/, retrieved from Internet Archive on May 23, 2013, Archived Dec. 29, 2008 (2 pages).

http://damballa.com, retrieved from Internet Archive on May 23, 2013, Archived Jan. 28, 2007 (10 pages).

http://www.dnswl.org, retrieved from Internet Archive on May 23, 2013, Archived Jul. 15, 2006 (4 pages).

http://www.spamhaus.org/sbl/, retrieved from Internet Archive on May 23, 2013, Archived Sep. 24, 2006 (24 pages).

http://malwaredomains.com, retrieved from Internet Archive on May 23, 2013, Archived Dec. 28, 2007 (12 pages).

(56) References Cited

OTHER PUBLICATIONS http://www.opendns.com, retrieved from Internet Archive on May 23, 2013, Archived Sep. 9, 2006 (25 pages).
https://zeustracker.abuse.ch, retrieved from Internet Archive on May 23, 2013, Archived Oct. 26, 2010 (37 pages).
http://www.threatfire.com, retrieved from Internet Archive on May 23, 2013, Archived Aug. 22, 2007 (18 pages).
http://www.avira.com, retrieved from Internet Archive on May 23, 2013, Archived Sep. 29, 2006 (13 pages).
https://alliance.mwcollect.org, retrieved from Internet Archive on May 23, 2013, Archived Jan. 7, 2007 (2 pages).
http://malfease.oarci.net, retrieved from Internet Archive on Apr. 11, 2014, Archived Apr. 12, 2008 (2 pages).
http://www.oreans.com/themida.php, retrieved from Internet Archive on May 23, 2013, Archived Aug. 23, 2006 (12 pages).
http://www.vmware.com, retrieved from Internet Archive on May 23, 2013, Archived Sep. 26, 2006 (32 pages).
Thomas Ptacek, "Side-Channel Detection Attacks Against Unauthorized Hypervisors", http://www.matasano.com/log/930/side-channel-detection-attacks-against-unauthorized-hypervisors/, Aug. 20, 2007, retrieved from Internet Archive on May 23, 2013, Archived Aug. 27, 2007 (12 pages).
http://cyber-ta.org/releases/botHunter/index.html, retrieved from Internet Archive on May 23, 2013, Archived Aug. 30, 2007 (6 pages).
http://anubis.seclab.tuwien.ac.at, retrieved from Internet Archive on May 23, 2013, Archived Apr. 9, 2008 (2 pages).
http://www.siliconrealms.com, retrieved from Internet Archive on May 23, 2013, Archived Sep. 4, 2006 (12 pages).
http://bitblaze.cs.berkeley.edu, retrieved from Internet Archive on May 23, 2013, Archived Jan. 28, 2008 (4 pages).
http://www.dyninst.org, retrieved from Internet Archive on May 23, 2013, Archived Aug. 20, 2006 ( pages).
http://www.peid.info, retrieved from Internet Archive on May 23, 2013, Archived Dec. 4, 2007 (2 pages).
Mark Russinovich et al., "RegMon for Windows V7.04", http://technet.microsoft.com/en-us/sysinternals/bb896652.aspx, Published Nov. 1, 2006 (4 pages).
"Troj/Agobot-IB", http://www.sophos.com/virusinfo/analyses/trojagobotib.html, printed Jun. 27, 2012 (1 page).
Mark Russinovich et al., "FileMon for Windows V7.04", http://technet.microsoft.com/en-us/sysinternals/bb896642.aspx, Nov. 1, 2006 (6 pages).
"Norman Sandbox Whitepaper", Copyright Norman 2003 (19 pages).
Tanveer Alam et al., "Webinar: Intel Virtualization Technology of Embedded Applications", Intel, Copyright 2010 (34 pages).
F. Heinz et al., "IP Tunneling Through Nameserver", http://slashdot.org/story/00/09/10/2230242/ip-tunneling-through-nameservers, Sep. 10, 2000 (23 Pages).
http://www.mcafee.com/us/, printed May 23, 2013 (23 pages).
"Windows Virtual PC ", http://en.wikipedia.org/wiki/Windows_Virtual_PC, Last Modified May 5, 2013, Printed May 23, 2013 (21 pages).
Par Fabien Perigaud, "New Pill?", http://cert.lexsi.com/weblog/index.php/2008/03/21/223-new-pill, Mar. 21, 2008 (3 pages).
http://handlers.sans.org/jclausing/userdb.txt, printed May 24, 2013 (149 pages).
Avi Kivity et al., "KVM: The Linux Virtual Machine Monitor", Proceedings of the Linux Symposium, pp. 225-230, Jun. 27-30, 2007.
Symantec, "Symantec Global Internet Security Threat Report: Trends for 2008", vol. XIV, Apr. 2009 (110 pages).
File History of U.S. Appl. No. 11/538,212.
File History of U.S. Appl. No. 13/008,257.
File History of U.S. Appl. No. 14/015,621.
File History of U.S. Appl. No. 14/304,015.
File History of U.S. Appl. No. 12/538,612.
File History of U.S. Appl. No. 13/205,928.
File History of U.S. Appl. No. 13/309,202.
File History of U.S. Appl. No. 13/749,205.
File History of U.S. Appl. No. 14/010,016.
File History of U.S. Appl. No. 14/015,663.
File History of U.S. Appl. No. 14/015,704.
File History of U.S. Appl. No. 14/015,661.
File History of U.S. Appl. No. 14/041,796.
File History of U.S. Appl. No. 14/096,803.
File History of U.S. Appl. No. 14/194,076.
File History of U.S. Appl. No. 14/305,998.
File History of U.S. Appl. No. 14/317,785.
File History of U.S. Appl. No. 14/616,387.
File History of U.S. Appl. No. 14/668,329.
File History of U.S. Appl. No. 15/019,272.
Leo Breiman, "Bagging Predictors", Machine Learning, vol. 24, pp. 123-140 (1996).
David S. Anderson et al., "Spamscatter: Characterizing Internet Scam Hosting Infrastructure", Proceedings of the USENIX Security Symposium (2007) (14 pages).
Sujata Garera et al., "A Framework for Detection and Measurement of Phishing Attacks", WORM'07, pp. 1-8, Nov. 2, 2007.
Torsten Horthorn et al., "Double-Bagging: Combining Classifiers by Bootstrap Aggregation", Pattern Recognition, vol. 36, pp. 1303-1309 (2003).
Roberto Perdisci et al., "Detecting Malicious Flux Service Networks Through Passive Analysis of Recursive DNS Traces", Proceedings of ACSAC, Honolulu, Hawaii, USA (2009) (10 pages).
Shuang Hao et al., "Detecting Spammers with SNARE: Spatiotemporal Network-Level Automatic Reputation Engine", 18th USENIX Security Symposium, pp. 101-117 (2009).
Kazumichi Sato et al., "Extending Black Domain Name List by Using Co-Occurrence Relation Between DNS Queries", Presentation in the Third USENIX LEET Workshop (2010) (22 pages).
Sushant Sinha et al., "Shades of Grey: On the Effectiveness of Reputation-Based Blacklists", In 3rd International Conference on Malware (2008) (8 pages).
Zhiyun Qian et al., "On Network-Level Clusters for Spam Detection", In Proceedings of the USENIX NDSS Symposium (2010) (17 pages).
Bojan Zdrnja et al., "Passive Monitoring of DNS Anomalies", In Proceedings of DIMVA Conference (2007) (11 pages).
Jian Zhang et al., "Highly Predictive Blacklisting", In Proceedings of the USENIX Security Symposium (2008) (16 pages).
http://www.uribl.com/about.shtml, retrieved from Internet Archive on Mar. 16, 2016, Archived Jul. 22, 2010 (4 pages).
http://www.spamhaus.org/zen/, retrieved from Internet Archive on Mar. 16, 2016, Archived Jul. 6, 2010 (3 pages).
Mathew Sullivan, "Fighting Spam by Finding and Listing Exploitable Servers", Apricot 2006 (26 pages).
Mekky et al. (Detecting Malicious HTTP Redirections Using Trees of User Browser Activity, IEEE INFOCOM 2014, pp. 1159-1167).
Nan Jiang et al., "Identifying Suspicious Activities Through DNS Failure Graph Analysis", In proceedings of the 18th IEEE International Conference on Network Protocols (ICNP'10) IEEE Computer Society, Washington, DC, USA, 144-153.
U.S. Appl. No. 11/538,212, 2008-0028463, Jan. 31, 2008, U.S. Pat. No. 8,566,928.
U.S. Appl. No. 12/538,612, 2010-0037314, Feb. 11, 2010, Pending.
U.S. Appl. No. 12/985,140, 2011-0167495, Jul. 7, 2011, U.S. Pat. No. 8,578,497.
U.S. Appl. No. 13/008,257, 2011-0283361, Nov. 17, 2011, U.S. Pat. No. 8,826,438.
U.S. Appl. No. 13/205,928, 2012-0042381, Feb. 16, 2012, Pending.
U.S. Appl. No. 13/309,202, 2012-0143650, Jun. 7, 2012, Pending.
U.S. Appl. No. 13/358,303, 2012-0198549, Aug. 2, 2012, U.S. Pat. No. 8,631,489.
U.S. Appl. No. 13/749,206, 2013-0191915, Jul. 25, 2013, Pending.
U.S. Appl. No. 14/010,016, 2014-0059216, Feb. 27, 2014, Pending.
U.S. Appl. No. 14/015,582, 2014-0068763, Mar. 6, 2014, Pending.
U.S. Appl. No. 14/015,621, 2014-0075558, Mar. 13, 2014, U.S. Pat. No. 9,166,994.
U.S. Appl. No. 14/015,663, 2014-0090058, Mar. 27, 2014, Pending.
U.S. Appl. No. 14/015,704, 2014-0068775, Mar. 6, 2014, Pending.

(56) References Cited

OTHER PUBLICATIONS

U.S. Appl. No. 14/015,661, 2014-0245436, Aug. 28, 2014, U.S. Pat. No. 9,306,969.
U.S. Appl. No. 14/041,796, 2014-0101759, Apr. 10, 2014, Pending.
U.S. Appl. No. 14/096,803, 2014-0157414, Jun. 5, 2014, Pending.
U.S. Appl. No. 14/194,076, Feb. 28, 2014, Abandonded.
U.S. Appl. No. 14/304,015, Jun. 13, 2014, Abandoned.
U.S. Appl. No. 14/305,998, 2014-0373148, Dec. 18, 2014, Pending.
U.S. Appl. No. 14/317,785, 2015-0026808, Jan. 22, 2015, Pending.
U.S. Appl. No. 14/616,387, 2015-0222654, Aug. 6, 2015, Pending.
U.S. Appl. No. 14/668,329, Mar. 25, 2015, Pending.
U.S. Appl. No. 15/019,272, Feb. 9, 2016, Pending.
Kristoff, "Botnets, Detection and Mitigation: DNS-Based Techniques," NU Security Day (2005) 23 pages, www.it.northwesterd.edu/bin/docs/bots_Kristoff_jul05.ppt.
Park et al. "Fast Malware Classification by Automated Behavioral Graph Matching" (2010) Proceedings of the Sixth Annual Workshop on Cyber Security and Information Intelligence Research (CSIIRW '10), ACM pp. 1-4.

\* cited by examiner

DATA MINING TO IDENTIFY MALICIOUS ACTIVITY

CROSS-REFERENCE TO RELATED APPLICATIONS

This application is based on and derives the benefit of the filing date of U.S. Provisional Patent Application No. 61/696,009, filed Aug. 31, 2012. The entire content of this application is herein incorporated by reference in its entirety.

DETAILED DESCRIPTION OF SEVERAL EMBODIMENTS

Methods and systems described herein may detect malicious activity, for example malicious activity within computer networks, present users with evidence in order to confirm an identification of infection, and/or annotate a detection with information which may explain some or all of the infection cycle allowing users to revisit their security policies and/or understand the severity of the infection. Identification, capture, index, and/or examination of network summary information, including network summary information which might contribute to a detection or understanding of a threat, may be performed. Historical, present, and/or future network events may be compared to simulated data in order to discover effects and/or implications of malicious activity. Historical, present, and/or future network data may be re-examined, captured, and/or indexed to discover precursors to malicious activity, present malicious activity, and/or future malicious activity. Discovery and/or recovery of historical infector malware may be performed based on future network communications. The probability of maliciousness in network traffic patterns and/or the degree of automation within suspicious network activity may be determined.

Devices operating the various applications and performing the various processes described herein may comprise one or more computers. Computers may be linked to one another via a network or networks. A computer may be any programmable machine capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers. A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via WiFi, WiMax, or other wireless connection). Connections between computers may use any protocols, including connection oriented protocols such as TCP or connectionless protocols such as UDP. Any connection through which at least two computers may exchange data can be the basis of a network.

Figure 1:
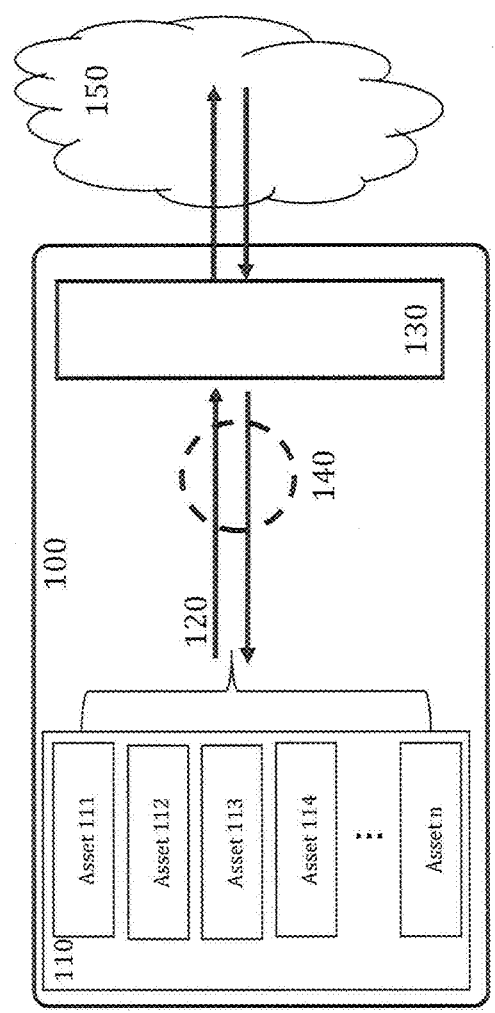
FIG. 1 depicts a network according to an embodiment of the invention.

FIG. 1 depicts a network 100 according to an embodiment of the invention. The network 100 may be, for example, an internal network such as a business network, home network, educational network, or the like. The network 100 may include assets 110 such as computers, switches, routers, other networked devices, and/or other infrastructure to support internal and external network communications. Each asset 110 may be an individual endpoint (111, 112, . . . n) within the network 100. The network 100 may also include infrastructure 130 for facilitating external network communication, for example firewalls, proxy servers, DNS servers, routers, and/or switches. This infrastructure 130 may enable network traffic 120 to flow to and from external networks 150 such as the Internet or a private network. One or more computer systems 140 for identifying malicious network activity may also be included in the network 100. As will be described in greater detail below, these systems 140 may have deep packet inspection, packet reassembly, and/or traffic analysis capabilities for monitoring assets 110 and traffic 120. These systems 140 may identify and capture/index network summary information which might contribute to an increased detection or understanding of a threat: By storing summary attributes of certain network events, it may be possible to both efficiently capture/index attributes as well as search and correlate this data. The network 100 of FIG. 1 may be a typical network description, but the systems and methods described herein are not limited to any specific network topology, network traffic, or destinations residing on the Internet. For example external networks 150 may include a private network, infrastructure 130 may represent varying combinations of network infrastructure and different topologies, and the network 100 may be a service provider network, an MPLS WAN network, or a higher-ed (EDU) network.

Capture and Index of Network Information

Figure 2:
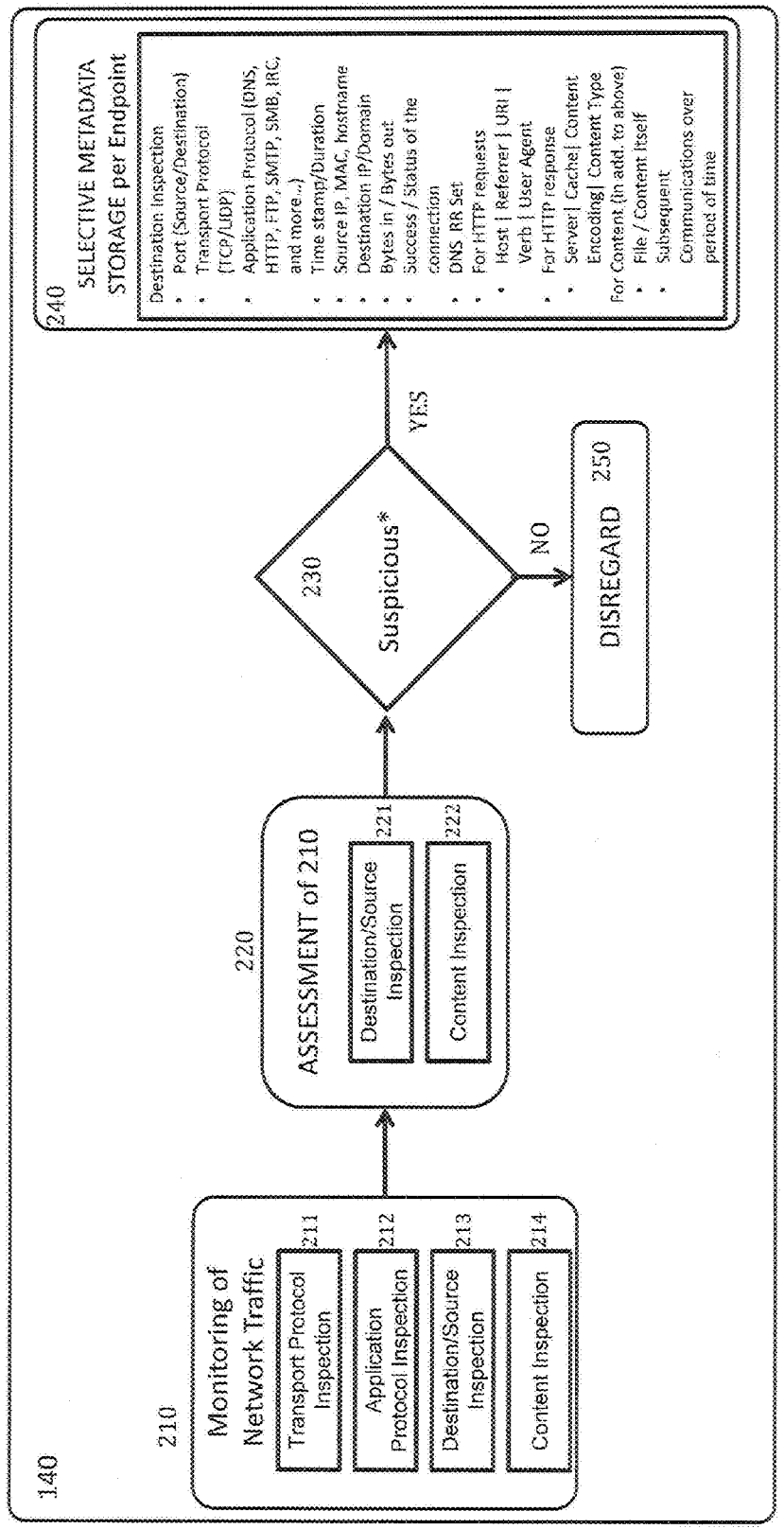
FIG. 2 depicts a monitoring process according to an embodiment of the invention.

FIG. 2 depicts a monitoring process 200 according to an embodiment of the invention. This example process 200 may be performed by the computer systems 140 of FIG. 1. Network traffic 120 may be monitored 210. Monitoring 210 may include, but is not limited to, monitoring the traffic's 120 transport protocol 211, application protocol 212, destination and/or source 213, and/or content 214. Monitoring 210 may include storing data for further analysis. The monitored data may be assessed 220. Assessment 220 may be based on, but is not limited to, the destination and/or source 221 and content 222 of the monitored traffic. Based on the assessment 220, suspicious traffic may be identified 230. A determination of suspicion may be based on, for example, a low reputation score with respect to the destination of the network traffic; activity and files related to suspicious domain generation algorithm (DGA) clusters; and/or suspicious content such as files, headers, HTTP traffic, scripts, etc.

Many different techniques may be used to help determine traffic suspicion. For example, suspicion may be based on a low traffic destination reputation score. One or more databases may contain known malicious or legitimate domain reputations for the destination domain of a communication attempt. Also, reputations may be determined for unknown domains, for example by receiving passive DNS query information, utilizing the DNS query information to measure statistical features of known malicious and legitimate domain names, and utilizing the statistical features to determine a reputation of a new domain (for example, likely malicious or likely legitimate). For more information on systems and methods for determining suspicion based on a low reputation score, see U.S. Patent Application Publication 2012/0042381, "Method and System for Determining Whether Domain Names Are Legitimate or Malicious," the entirety of which is incorporated by reference herein.

Suspicion may also be based on communications with unregistered domains and/or domains generated by domain generation algorithms. For example, NX domains (NXs) may be domains not registered with authoritative domain name servers. Malware may use NXs to facilitate communication between network assets and external criminal networks. Detecting suspicious activity surrounding NXs may be done by collecting NX domain names from an asset, using these NX domain names to create testing vectors, classifying the testing vectors as benign vectors or malicious vectors based on training vectors, and classifying the asset as infected if the NX testing vector created from the collected NX is classified as a malicious vector. Other NX testing methods may be possible. NX domains may be generated by DGA clusters. Malware on an asset may use DGA to contact external criminal networks. In one example, detecting infections by malware using DGA may be done by clustering randomly generated NX domains that may have been generated by a DGA based on common characteristics, determining which clustered randomly generated domains are correlated in network usage and time, and using this data to determine the DGA that generated the clustered randomly generated domain names. For more information on systems and methods for determining suspicion based on activities and files related to suspicious DGA clusters, see U.S. Patent Application Publication 2011/0167495, "Method and System for Detecting Malware" the entirety of which is incorporated by reference herein.

Both well-known techniques such as both static and dynamic file analysis, header anomalies, and script analysis as well as novel or unknown techniques may be employed as methods and procedures for determining suspicion based on content. For examples of other malware detection techniques which may be applicable to the systems and methods described herein, see U.S. Patent Application Publication 2012/0143650, "Method and System of Assessing and Managing Risk Associated with Compromised Network Assets," the entirety of which is incorporated by reference herein. Those of ordinary skill in the art will appreciate that other tests and criteria for suspicious activity may be possible.

If the activity is not regarded as suspicious, it may be disregarded 250. If the activity is regarded as suspicious, then metadata associated with the activity may be captured and indexed 240. This may be done using well known techniques in some embodiments. Examples of metadata that may be associated with the activity may include, but are not limited to:

Destination Inspection
    Port (Source/Destination)
    Transport Protocol (TCP/UDP)
    Application Protocol (DNS, HTTP, FTP, SMTP, SMB, IRC, etc.)
    Time stamp and/or duration
    Source IP, MAC, hostname
    Destination IP/Domain
    Bytes in/Bytes out
    Success/Status of the connection
    DNS RR Set
    For HTTP requests
    Host, Referrer, URI, Verb, User Agent, etc.
    For HTTP response
    Server, Cache, Content Encoding, Content Type, etc.
For Content
    File or Content Itself
    Subsequent Communications over period of time Data that is captured and indexed may provide forensic information surrounding infections on assets 110 within the network 100 and may serve as the base activity for other methods and systems presented below.

Simulated Traffic Comparison

Once suspicious activity is identified, historical, present and/or future network events may be compared to simulated data in order to discover the effects and implications of malicious activity: Simulated traffic comparison may be performed to prove that malware actually ran on an asset 110 in question and/or to explain the lifecycle of the infection. Proving that the malware ran may involve matching actual network data related to the asset 110, collected utilizing the methods described above with respect to FIG. 2 for example, against destination data contained in simulated data generated by a malware analysis engine. For example, if specific destination data traits (for example, destinations, paths, patterns, and behaviors) are observed in both simulated data and actual data from assets 110, then those traits may become strong indicators of compromise, as the similarity of the temporal occurrence and the uniqueness of the traits may be statistically relevant. Having proof of malware running on an internal asset 110 may allow a system to reduce a false positive rate, may remove conviction uncertainty on die part of a network user or administrator, and may help a network user or administrator to understand the severity of the infection inclusive of but not limited to the systems and methods described in U.S. 2012/0143650. Other examples may include correlation with other customer security product events such as proxy block pages, resulting connections to sinkholed destinations, determination that the infection has disabled host based protection via registry key changes, etc. Explaining the infection lifecycle may include matching the buffered data against data associated with research intelligence systems that may perform reputation, content, and behavioral analysis to determine a type of criminal destination (infector, updater, data drop, etc.) inclusive of but not limited to the systems and methods described in U.S. 2012/0042381, as well as other proprietary systems that identify C&C destinations, DGA activity, or clusters of malware, for example. Based on this analysis, an annotation of criminal destination type in the user interface may allow for accurate severity scoring inclusive of but not limited to the systems and methods described in U.S. 2012/0143650. Other examples may include correlation with other customer security product events such as proxy block pages, resulting connections to sinkholed destinations, determination that the infection has disabled host based protection via registry key changes, etc. Such annotation may help a user to understand the severity of the infection, may allow the system to identify how much data has been exfiltrated, may allow understanding of malware update frequency, may allow the use of host-based software, which may include well-known third party software, to retrieve malware updates that were encrypted payloads over the network, and may allow a determination of the infection profile (low and slow, password stealer, spammer, infecting other internal assets, etc).

Figure 3A:
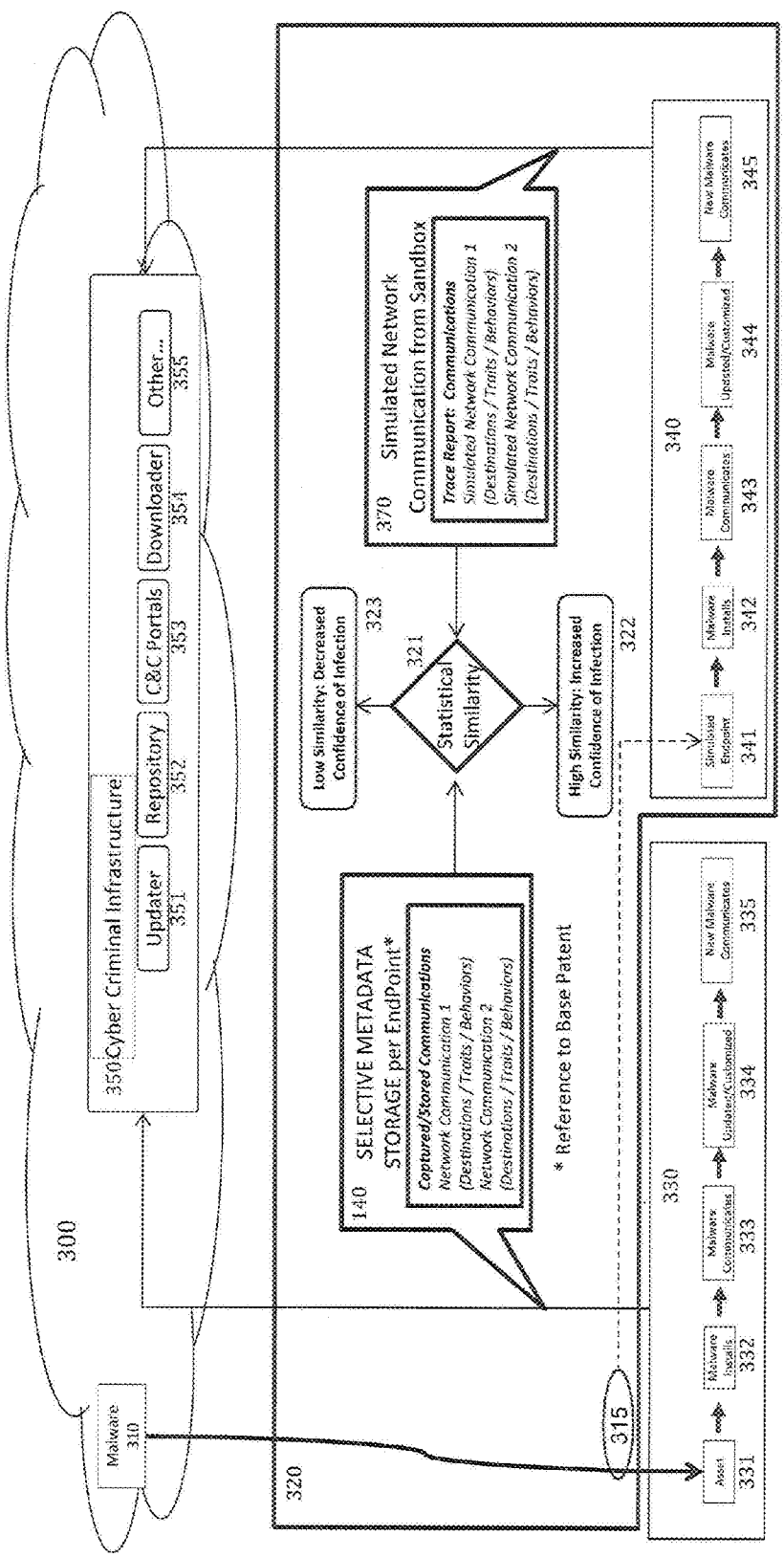
FIG. 3A depicts an analysis system according to an embodiment of the invention.
Figure 3B:
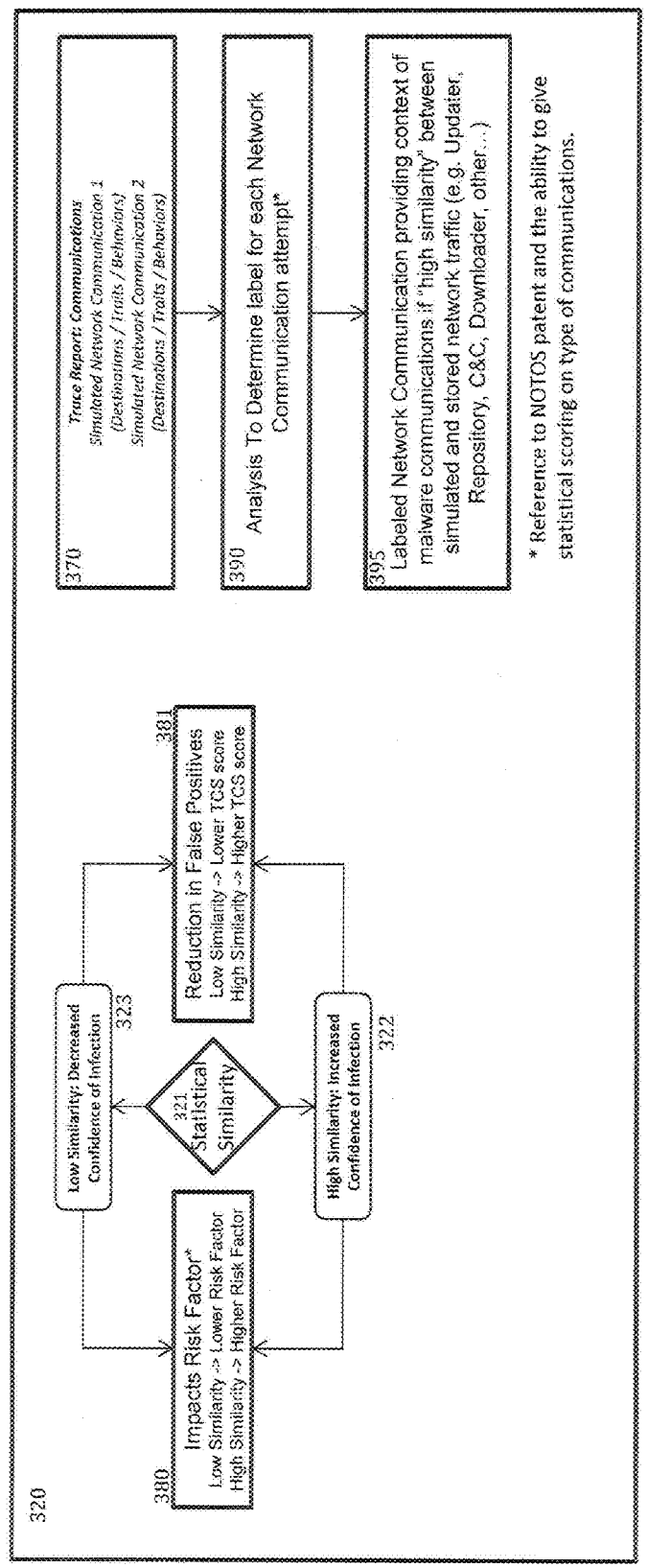
FIG. 3B depicts an analysis system according to an embodiment of the invention.

FIGS. 3A-3B depict an analysis system 320 according to an embodiment of the invention. This example system 320 is presented in the context of an example flow of an infection lifecycle with an infection vector wherein malware 310 from an external network 300 may enter an internal network 330 and may be delivered to an endpoint asset 331. If the malware 310 successfully infects the endpoint 331, then the malware 310 may install 332 and communicate 333 to a cyber-criminal infrastructure 350 to get updated 351. After an update 351, the malware 310 may download a new malware sample with a downloader 354 and may be updated/customized to new malware 334. The new malware 334 may the communicate 335 to the cyber-criminal infrastructure 350. The communication 335 may include criminal communication such as delivering stolen data to a repository 352, receiving new instructions via command and control (C&C) portals 353, and/or other communication types 355.

During an initial transit of malware 310 from an external network 300 to the internal network 330, the system 320 may watch the malware 310 in motion and may make a copy of the malware 315 for analysis. The copy of the malware 315 may be delivered to a dynamic analysis sub-system 340, which may perform both static and dynamic analysis on the malware 315. The malware 315 may be loaded into the simulated endpoint 341, where the malware 315 may follow a similar infection lifecycle as did malware 310 on endpoint 331. In this example, malware may install 342, communicate 343 to the cyber criminal infrastructure 350, and/or be updated and customized 344. New malware may communicate 345 to the cyber criminal infrastructure 350.

The system 320 may include an asset, monitoring subsystem 140 (described with reference to FIG. 2 above), which may capture and index the selective network communications metadata of the potentially infected asset 331. The system 320 may also include a simulation monitoring subsystem 370, which may capture and index the simulated network communication activity from sub-system 340. The simulation monitoring subsystem 370 may be similar to the asset monitoring subsystem 140, but may monitor, assess, and store the simulated data instead of network traffic 120 data.

As seen in FIG. 3B, a comparison subsystem 321 may compare the captured and indexed activity of the asset monitoring subsystem 140 to the captured and indexed activity of the simulation monitoring subsystem 370. If the comparing reveals that the activity of the asset monitoring subsystem 140 and the simulation monitoring subsystem 370 is statistically similar 322, then there may be increased confidence in the infection being present on asset 331. If the comparing reveals that the activity of the asset monitoring subsystem 140 and the simulation monitoring subsystem 370 is not statistically similar 323, then it may be unlikely that an infection occurred.

If the activities are not statistically similar 323, then this may validate that an infection likely did not occur on the asset 331 and thus a lower confidence score 381 may be presented within a user interface that may be part of or in communication with, the system 320. This information may help reduce false positives. Furthermore, since it may be likely the malware 310 did not install on the asset 331, then there may be decreased risk 382, see for example U.S. 2012/0143650, posed to an organization and network 330 associated with the asset 331, and information indicating this low risk level may be presented within the user interface.

If the activities are statistically similar 322, then this may validate that an infection occurred and thus an increased confidence score 381 may be presented within the user interface. Furthermore, the confidence in the presence of the infection may increase the risk 382, see for example U.S. 2012/0143650, that the infection poses to the organization and network 330 associated with the asset 331, and information indicating this high risk level may be presented within the user interface. When the activities are statistically similar 322, the system 320 may take the simulated activity 370 and analyze 390, see for example U.S. 2012/0042381, and label 395 the monitored communications as updater, repository, downloader, C&C, etc., thereby generating information which may be used to identify how much data has been exfiltrated from the asset 331 and to where, to allow understanding of malware update frequency, a allow the use of host-based software to retrieve malware updates that were encrypted payloads over the network, and to allow a determination of the infection profile (low and slow, password stealer, information stealer spammer, infecting other internal assets, etc). The labeling may provide context to the purpose of each labeled communications, for example assessing the quantity of data delivered through communications labeled "repository" may indicate how much data theft is occurring and may indicate the threat type as an information stealer.

Reexamination of Indexed Historic, Present, and/or Future Data

Systems and methods may also be provided which may perform reexamination of indexed historic, present, and/or future data to discover precursors to malicious activity as well as present and future activity. This may provide a determination of an origin of the activity that led to the infection. For example, malware may have infected an asset 331 from an ad placed on CNN, a browser exploit, etc. Reexamination may be done by capturing referrer headers, URLs, timestamps, and other attributes. Reexamination may help a user to understand the infector lifecycle, to craft future security software rulesets, to inform acceptable use policies, and/or to reduce the uncertainty of an identified infection.

Discovery and/or recovery of historical infector malware based on future network communications or on future available intelligence based indicators may enable retroactive discovery of stealthy infector malware that may have caused an initial infection on an asset machine. As noted above, suspicious metadata may be stored. The system may also store binaries downloaded in the network for a period of time, and once malicious network traffic is discovered, binaries downloaded by an asset 110 that is suspected to be infected may be meticulously examined to determine the infector malware. This determination may then be provided to a user. Trace data for the infector malware may also be provided to the user. This may allow the discovery of stealthy malware and may provide a technique for thwarting malware detection evasion techniques.

Figure 4:
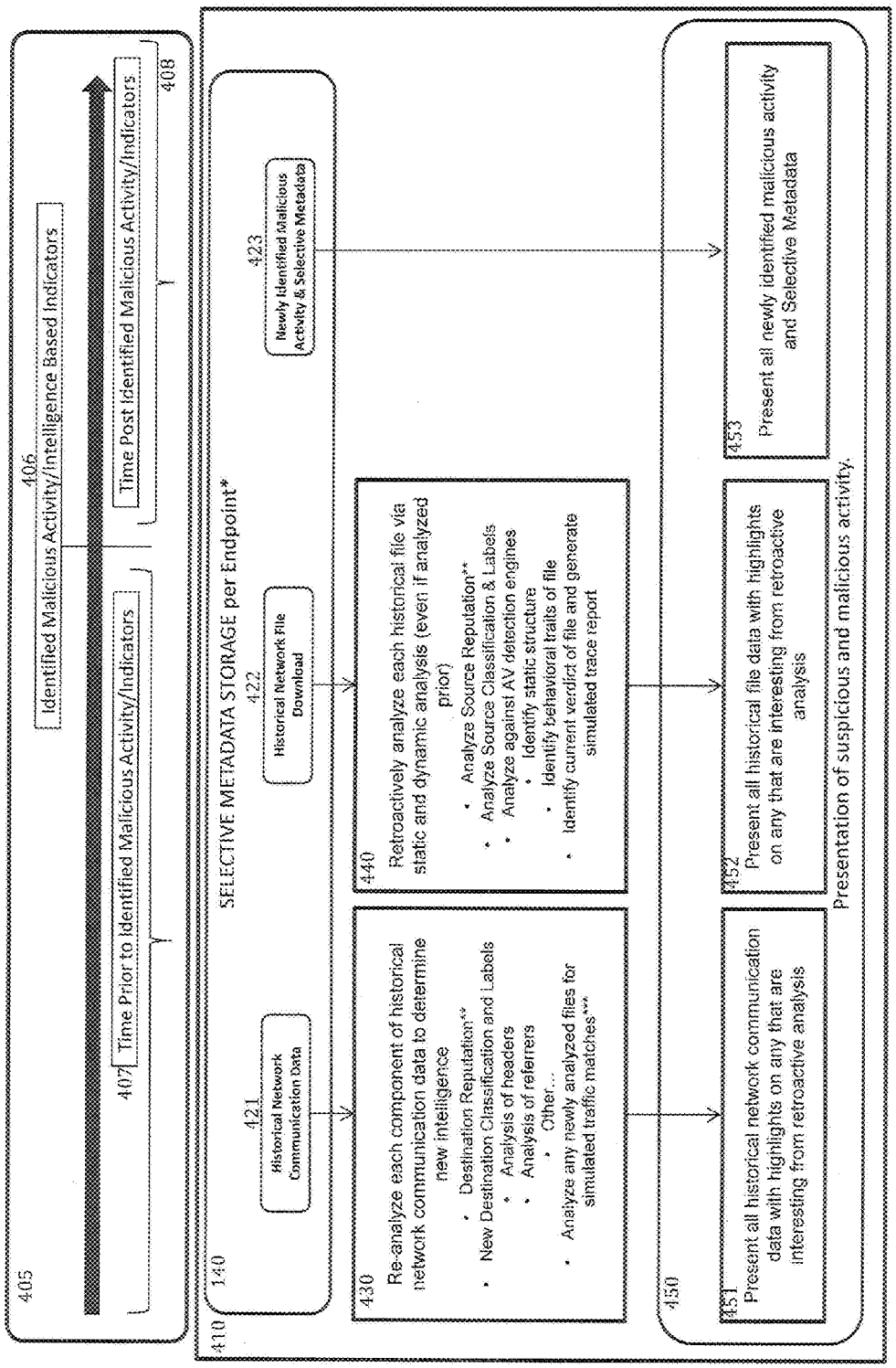
FIG. 4 depicts an analysis process according to an embodiment of the invention.

FIG. 4 depicts an analysis process 400 according to an embodiment of the invention. This process 400 may involve the collection and/or analysis of data related to malicious activity of an infection on an asset 110 within a network 100. The timeline 405 in this example shows the time when malicious activity is identified or new threat intelligence based indicators are available 406, the time prior to identification 407, and the time period post identification 408.

During the time prior to identification 407, the discovery/recovery system 410 may utilize the monitoring system 140 described above, which may selectively capture and/or index metadata associated with the activity of endpoints 110 in the network 100. Specifically, historical network communication data may be gathered 421 and analyzed 430. Similarly, historical network file downloads and other suspicious content may be gathered 422 and analyzed 440. Newly identified malicious activity and selective metadata may also be gathered 423.

The analysis of historical network communication data 430 may include analysis and/or re-analysis of each component of historical network communication data to determine new intelligence. As discussed above, network data may be identified as suspicious and may be stored. In many cases, the data may not be immediately analyzed and/or may not be suspicious enough at the time of detection to warrant reporting to a user. However, if an infection is identified, this suspicious data may become more interesting. Analysis and/or reanalysis may be performed to provide deep analysis on data which may have been ignored before identification of infection due to scalability concerns associated with analyzing all collected data. In some cases, brief analysis may be performed upon collection of suspicious data, and more thorough analysis may be triggered by infection identification or by new threat intelligence indicators being available. In other cases, all data (instead of only suspicious data) may be captured by a monitoring system, and analysis of stored data may be triggered by infection identification.

For example a communication attempt may be deemed suspicious enough to capture and index but not suspicious enough at the time of determination to bring to the customer's attention. In this example, there may be 100 indexed but not reported events for an endpoint. At a later date, which may be after detection of an infection in the endpoint, advanced techniques may be applied to examine these 100 events. Examples of analysis and/or reanalysis that may be performed include:

- Destination Reputation, for example identifying known malicious or legitimate domain reputations for the destination domain of a communication attempt. See for example U.S. 2012/0042381.
- New Destination Classification and Labels, for example receiving passive DNS query information, utilizing the DNS query information to measure statistical features of known malicious and legitimate domain names, and utilizing the statistical features to determine a reputation of a new domain (for example, likely malicious or likely legitimate). See for example U.S. 2012/0042381.
- Analysis of headers, for example examining traffic for malformed headers that may have not been considered serious enough to generate an alert.
- Analysis of referrers, for example to provide contextual information related to the source of potential malicious communications.
- Other, for example the identification of new behavioral patterns or properties based on observed historical activities.
- Analyze any newly analyzed files for simulated traffic matches, described in greater detail below with respect to automation discovery.

A user interface 450 may be part of or in communication with the discovery/recovery system 410. The results of the historical network communication data analysis 430 may be presented 451 in the user interface 450. Historical network communication data and highlights on any historical data deemed interesting from retroactive analysis may be presented 451.

The analysis of historical network file downloads and other suspicious content 440 may include retroactive analysis of each historical file and content via static and dynamic analysis. This may be done even for data that may have been analyzed in the past:

- Analyze Source Reputation, for example identifying known malicious or legitimate domain reputations for the domain from which one or more files were downloaded. See for example U.S. 2012/0042381.
- Analyze Source Classification & Labels, for example receiving passive DNS query information, utilizing the DNS query information to measure statistical features of known malicious and legitimate domain names, and utilizing the statistical features to determine a reputation of the domain from which one or more files were downloaded (for example, likely malicious or likely legitimate). See for example U.S. 2012/0042381.
- Analyze against third party commodity AV detection engines. Identify static structure, for example by searching for well-known malware, identifying trademarks, or finding that a large part of an executable is encrypted.
- Identify behavioral traits of file, for example identifying an executable which may start sending email without user interaction or a PDF file which may initiate network communication.
- Identify current verdict of file and generate simulated trace report, for example by allowing the file to execute and examining changes to the underlying system. These changes may be analyzed to generate a verdict representing the file's behavior.

The results of the historical network file downloads and other suspicious content analysis 440 may be presented 452 in the user interface 450. Historical file data within the time period before identification time period 406 and highlights on any historical data deemed interesting from retroactive analysis may be presented 452.

An example of historical, present, and/or future analysis may proceed as follows. Infection may occur at 8:00 AM with a dropper that infects an endpoint. The dropper may communicate with a criminal infrastructure and receive a new malware update at 8:30 AM. The update may be a new piece of malware that is sent down in an encrypted payload. That new malware may begin to communicate at 8:35 AM. The system may identify these true malicious communications at 8:35 AM. If all suspicious files downloaded to this endpoint (including the one that caused the infection at 8:00 AM), captured metadata associated with the files, and network communications (which may include communications by the dropper) have been stored, this suspicious data may now be analyzed. The system may retroactively examine the files downloaded prior to the 8:35 AM identification (which may include the dropper at 8:00 AM) and reexamine the suspicious network traffic (which may include the dropper's communications up to the criminal operator). Going forward, other suspicious communications that the infected endpoint makes that may not necessarily be suspicious enough to attribute directly to the infection may now be examined closely. In this example, the identification of a threat at 8:35 AM caused the system to retroactively examine suspicious network traffic and files that may have led to the infection.

When any malicious activity is identified 406, any malicious activity and/or selective metadata newly identified during the present 406 and/or future time period 406 may be captured 423 and presented 453 in the user interface 450. As noted above, this may provide a determination of an origin of the activity that led to the infection and/or help a user to understand the infector lifecycle, to craft future security software rulesets, to inform acceptable use policies, and/or to reduce the uncertainty of an identified infection.

Automation Discovery

Systems and methods may also be provided for determining a degree of automation within suspicious network activity. This may be used to show that malware convictions that were arrived at via other detection techniques exhibit automated behavior (behavior that is machine based instead of user based). This may reduce the uncertainty of convictions.

Figure 5:
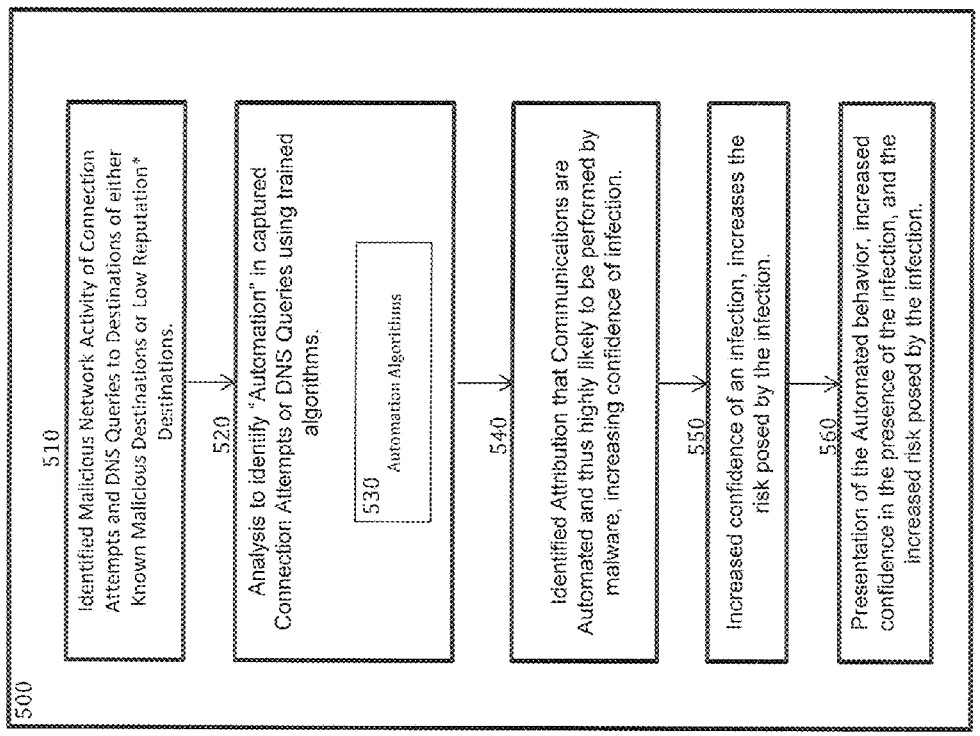
FIG. 5 depicts a real time analysis process according to an embodiment of the invention.

FIG. 5 depicts a real time analysis process 500 according to an embodiment of the invention. Observed network traffic with either known or low reputation destinations may be collected 510. Analysis of the collected data may be performed 520 which may result in statistical scoring to indicate how automated the observed communications are used on their temporal patterns and attributes. In some embodiments, the analysis may determine the degree of automation via constantly evolving algorithms, an example of which can be described by examining the temporal deltas (time between each) of a series of malware communications and performing statistical analysis to determine that each delta is similar to all of the other deltas. In such an example, the more statistically similar each delta is to the group, the higher the automation score may be. Those of ordinary skill in the art will appreciate that other analysis and/or scoring techniques may be used to identify and/or classify potential automation. The statistical scoring of automation may be based on algorithms 530 built by observing known malware. If statistical scoring indicates a high degree of automation, then the system may indicate a high level of confidence of an infection 540 and thus a high risk factor 550 of the infection and present this information 560 via a user interface.

The probability of maliciousness in network traffic patterns may also be determined. This may allow net new detections via the presence of automated traffic patterns. Data may be gathered as described above with respect to FIG. 2, and this data may be analyzed for the presence of automated behavior using algorithms and low reputation or other information indicative of a malware destination. This may allow the system to detect new threats without any foreknowledge of the threat, and may reduce conviction uncertainty.

Figure 6:
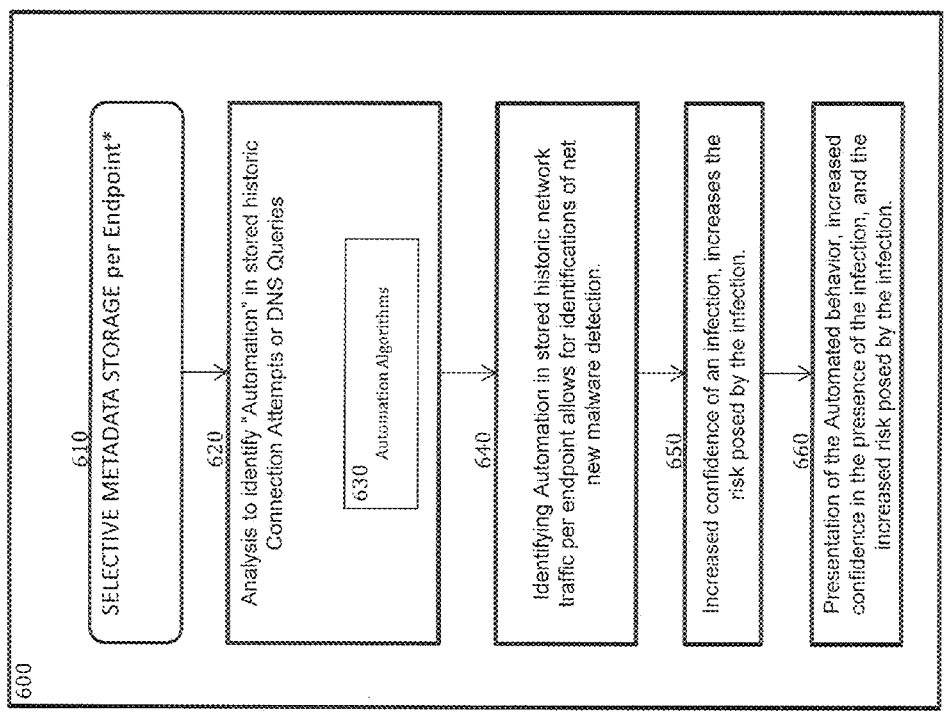
FIG. 6 depicts an historical analysis process according to an embodiment of the invention.

FIG. 6 depicts an historical analysis process 600 according to an embodiment of the invention. As described above with respect to FIG. 2, suspicious network traffic may have been captured and indexed. This captured and indexed data may be retrieved 610 for analysis. Analysis of the indexed data may be performed 620, resulting in statistical scoring to indicate how automated the observed communications are. This analysis may use similar techniques to those described above for existing malware detection. The statistical scoring of automation may be based on algorithms 630 built by observing known malware. If statistical scoring indicates a high degree of automation, then the system may indicate a high level of confidence of an infection 640 and thus a high risk factor 650 of the infection and present this information 660 via a user interface.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method comprising:
   monitoring, with at least one processor in communication with a network, network traffic of an asset associated with the network;
   assessing, with the at least one processor, the network traffic to determine a content of the network traffic a source for the network traffic, and a destination for the network traffic;
   wherein assessing the source for the network traffic comprises at least one of determining a source reputation score and determining whether the source is associated with a suspicious domain generation algorithm cluster, and
   wherein assessing the destination for the network traffic comprises determining a destination reputation score based on a relation to a domain generation algorithm (DGA) and a threat level of the content of the network traffic, the threat level being based on at least one of file content, one or more headers, HTTP traffic, and one or more scripts;
   determining, with the at least one processor, whether the network traffic is suspicious network traffic based on the assessed network traffic; and
   when the network traffic is determined to be suspicious network traffic, capturing, with the at least one processor, metadata associated with the suspicious network traffic and storing the metadata in a database in communication with the processor.

2. The method of claim 1, wherein the monitoring comprises monitoring a transport protocol of the network traffic, monitoring an application protocol of the network traffic, monitoring the source and/or destination of the network traffic, and/or monitoring the content of the network traffic.

3. The method of claim 1, further comprising:
   when the network traffic is determined to be suspicious network traffic, indexing, with the at least one processor, the metadata.

4. The method of claim 1, wherein the metadata comprises a source port, a destination port, a transport protocol, an application protocol, a time stamp, a duration, a source identifier, a destination identifier, a bytes in count, a bytes out count, a connection success indicator, a connection status, a DNS RR set, HTTP data, a file within the content of the network traffic, the content of the network traffic, and/or a subsequent communication.

5. The method of claim 1, further comprising:
when the network traffic is determined to be suspicious network traffic, sending, with the at least one processor, a report indicating that the network traffic is determined to be suspicious network traffic to a display in communication with the at least one processor.

6. The method of claim 1, wherein determining whether the network traffic is suspicious network traffic comprises determining that all traffic to and/or from the asset is suspicious network traffic when the asset is an asset with a potential malware infection.

7. A system comprising:
a database; and
at least one microprocessor in communication with a network and in communication with the database, the at least one microprocessor being constructed and arranged to:
monitor network traffic of an asset associated with the network;
assess the network traffic to determine a content of the network, a source for the network traffic, and a destination for the network traffic;
wherein the assessment of the source for the network traffic comprises of a determination of a source reputation score based on of a relation to a domain generation algorithm (DGA) and a threat level of the content of the network traffic, the threat level being based on at least one of file content, one or more headers, HTTP traffic, and one or more scripts;
determine whether the network traffic is suspicious network traffic based on the assessed network traffic; and
when the network traffic is determined to be suspicious network traffic, capture metadata associated with the suspicious network traffic and store the metadata in the database.

8. The system of claim 7, wherein the monitoring comprises monitoring a transport protocol of the network traffic, monitoring an application protocol of the network traffic, monitoring the source and/or destination of the network traffic, and/or monitoring the content of the network traffic.

9. The system of claim 7, wherein the at least one microprocessor is further constructed and arranged to:
when the network traffic is determined to be suspicious network traffic, index the metadata.

10. The system of claim 7, wherein the metadata comprises a source port, a destination port, a transport protocol, an application protocol, a time stamp, a duration, a source identifier, a destination identifier, a bytes in count, a bytes out count, a connection success indicator, a connection status, a DNS RR set, HTTP data, a file within the content of the network traffic, the content of the network traffic, and/or a subsequent communication.

11. The system of claim 7, wherein the at least one microprocessor is further constructed and arranged to:
when the network traffic is determined to be suspicious network traffic, send a report indicating that the network traffic is determined to be suspicious network traffic to a display in communication with the at least one microprocessor.

12. The system of claim 7, wherein the at least one microprocessor is constructed and arranged to determine whether the network traffic is suspicious network traffic with a method comprising determining that all traffic to and/or from the asset is suspicious network traffic when the asset is an asset with a potential malware infection.

13. A method comprising:
assessing, with at least one processor, network traffic associated with one or more applications from an external network to determine at least one of a source for the network traffic and a destination for the network traffic;
wherein the assessment of the at least one source for the network traffic comprises determining a source reputation score based on a relation to a domain generation algorithm (DGA) and a threat level of the content of the network traffic;
determining, with the at least one processor, whether the network traffic is suspicious network traffic based on the assessed network traffic;
based on the determining, capturing, with the at least one processor, metadata associated with the suspicious network traffic and storing the metadata in a database in communication with the processor;
executing, on a simulated network, a copy of the one or more applications from the external network and capturing metadata associated with simulated network traffic;
comparing the metadata associated with the suspicious network traffic to the metadata associated with the simulated network traffic;
determining, based on the comparing, when a statistical similarity exists between the metadata associated with the suspicious network traffic and the metadata associated with the simulated network traffic;
identifying, when a statistical similarity exists, the one or more applications as malicious.

* * * * *